(12) United States Patent
Chou et al.

(10) Patent No.: US 12,510,952 B2
(45) Date of Patent: Dec. 30, 2025

(54) ENERGY CONSUMPTION REGULATION METHOD AND SYSTEM

(71) Applicant: FLYTECH TECHNOLOGY CO., LTD., Taipei (TW)

(72) Inventors: Li-Chun Chou, Taipei (TW); Shui-Chin Tsai, Taipei (TW); Yu-Hsien Sung, Taipei (TW)

(73) Assignee: FLYTECH TECHNOLOGY CO., LTD., Taipei (TW)

( * ) Notice: Subject to any disclaimer, the term of this patent is extended or adjusted under 35 U.S.C. 154(b) by 90 days.

(21) Appl. No.: 18/645,611

(22) Filed: Apr. 25, 2024

(65) Prior Publication Data

US 2025/0110544 A1    Apr. 3, 2025

(30) Foreign Application Priority Data

Sep. 28, 2023   (TW) .................................. 112137432

(51) Int. Cl.
| | | |
|---|---|---|
| *G06F 1/00* | (2006.01) | |
| *G06F 1/3212* | (2019.01) | |
| *G06F 1/3234* | (2019.01) | |
| *G06F 1/3287* | (2019.01) | |
| *G06F 11/30* | (2006.01) | |
| *G06F 11/34* | (2006.01) | |
| *G06F 1/3203* | (2019.01) | |

(52) U.S. Cl.
CPC .......... *G06F 1/3287* (2013.01); *G06F 1/3212* (2013.01); *G06F 1/325* (2013.01); *G06F 11/3062* (2013.01); *G06F 11/34* (2013.01); *G06F 1/3203* (2013.01)

(58) Field of Classification Search
CPC ...... G06F 1/3287; G06F 1/3212; G06F 1/325; G06F 11/3062; G06F 11/34; G06F 1/3203; G06F 1/3265; G06F 1/3234; G06N 20/00
USPC ......................................................... 713/323
See application file for complete search history.

(56) References Cited

U.S. PATENT DOCUMENTS

| | | | | |
|---|---|---|---|---|
| 10,229,027 | B2 * | 3/2019 | Luo | .............. G06F 11/3072 |
| 10,401,831 | B2 * | 9/2019 | Lam | .............. G05B 19/0423 |
| 11,209,885 | B2 * | 12/2021 | Fukada | .............. G06F 1/3203 |
| 2002/0007388 | A1 * | 1/2002 | Bannai | .............. G06Q 10/06375 |
| | | | | 718/104 |

(Continued)

*Primary Examiner* — Volvick Derose
(74) *Attorney, Agent, or Firm* — Demian K. Jackson; Jackson IPG PLLC

(57) ABSTRACT

The present invention relates to an energy consumption regulation method. The method includes executing the following steps by a processor: continuously collecting and learning a plurality of first operation data about an electronic device, thereby automatically distinguishing an operation of the electronic device into a plurality of operation periods; automatically configuring a different plurality of energy configurations for the electronic device according to the different plurality of operation periods to regulate a maximum power of the processor, an operation mode of a backlight unit, a charging mode of a battery, and a peripheral energy management mode; and continuously collecting and learning a plurality of second operation data about the electronic device and autonomously updating and adjusting the plurality of operation periods and the plurality of energy configurations based on the plurality of second operation data.

14 Claims, 8 Drawing Sheets

(56) References Cited

U.S. PATENT DOCUMENTS

| | | | |
|---|---|---|---|
| 2006/0143483 A1* | 6/2006 | Liebenow | G06F 1/3203 |
| | | | 713/300 |
| 2010/0115259 A1* | 5/2010 | Elsila | H04M 1/72448 |
| | | | 709/217 |
| 2011/0283121 A1* | 11/2011 | Kuroda | G06F 1/3203 |
| | | | 713/310 |
| 2012/0210156 A1* | 8/2012 | Allen-Ware | G06F 1/3206 |
| | | | 713/340 |
| 2013/0235737 A1* | 9/2013 | Merlin | H04W 52/246 |
| | | | 370/252 |
| 2016/0054776 A1* | 2/2016 | Lu | G06F 1/10 |
| | | | 713/322 |
| 2016/0247437 A1* | 8/2016 | Choi | G09G 3/2003 |
| 2016/0378165 A1* | 12/2016 | Krishnappa | G06F 1/3212 |
| | | | 713/320 |
| 2017/0018941 A1* | 1/2017 | Wang | H02J 9/061 |
| 2017/0285722 A1* | 10/2017 | Kim | G06F 1/3296 |
| 2018/0299941 A1* | 10/2018 | Yu | G06F 1/324 |
| 2020/0284694 A1* | 9/2020 | Scott | G01H 1/00 |
| 2022/0019210 A1* | 1/2022 | Kuroda | H02J 3/003 |
| 2022/0272666 A1* | 8/2022 | Ji | H04W 72/02 |
| 2023/0318722 A1* | 10/2023 | Deforge | H04W 24/08 |
| | | | 370/252 |
| 2023/0394496 A1* | 12/2023 | Beer | G06Q 50/06 |
| 2024/0429730 A1* | 12/2024 | Abbott | H01M 10/46 |

\* cited by examiner

ENERGY CONSUMPTION REGULATION METHOD AND SYSTEM

CROSS-REFERENCE TO RELATED APPLICATION

This application claims priority benefit to Taiwan Invention Patent Applications No. 112137432, filed on Sep. 28, 2023, in Taiwan Intellectual Property Office, the entire disclosures of which are incorporated by reference herein.

FIELD

The present invention relates to an energy consumption regulation method and system, in particular to an energy consumption regulation method and system for automating and intelligentizing energy consumptions for various devices based on a machine learning technology.

BACKGROUND

Currently, ESG energy efficiency regulations have become a high priority issue worldwide. Governments and companies in various countries around the world are trying their best to establish and implement related regulations and standards. Taking Taiwan as an example, the Financial Supervisory Commission of Taiwan has clearly stated in the "Sustainable Development Action Plan for Listed and OTC Companies (2023)" released in March 2023 that small and medium-sized listed and OTC companies (SMEs) are required to submit sustainability reports, which is equivalent to mandatory compliance with ESG standards for most companies.

In light of this, software-based power management technology may become a powerful tool for companies to implement ESG energy efficiency. By continuously managing the power consumption of computer systems through software, significant energy savings can be achieved when large numbers of computers are operated over long periods of time. However, for the currently available power control software, there are still many shortcomings and deficiencies.

First, power control related to operating system types is usually categorized under power control options, providing users with settings for items such as hard disks, USB, PCI, and monitors for the computer system, such as power saving, balanced, high performance modes, and so on. Although there are many individual setting options, they can only provide a basic power management framework. There is still a lack of more advanced controls and settings. In addition, the configuration interface and operation process may be a bit complex and not easy to understand for most ordinary users who do not have a background in computer engineering or IT knowledge. Sometimes they may not know how to operate it properly. Once certain settings are changed, it may directly affect the stability of the system.

Second, some third-party power management software lacks automation modes. Some software with automated power optimization features often rely too much on default or static settings, and lack the ability to dynamically adjust power consumption based on actual usage. It can result in suboptimal power savings or an inability to adapt to changes in workload.

Moreover, some power control software relies too heavily on users to manually adjust settings or actively perform certain operations. However, this may increase the burden on users, and users may forget to perform power control, or additional personnel may be required to configure the software to achieve the best power savings. They lack intelligent features, and some power control software may consume too many system resources, resulting in reduced system performance and stability.

Hence, there is a need to solve the above shortcomings and deficiencies.

SUMMARY

The present invention relates to an energy consumption regulation method and system, in particular to an energy consumption regulation method and system for automating and intelligentizing energy consumptions for various devices based on a machine learning technology.

Accordingly, the present invention provides an energy consumption regulation method. The method includes: executing the following steps by a processor: continuously collecting and learning a plurality of first operation data about an electronic device, thereby automatically distinguishing an operation of the electronic device into a plurality of operation periods; automatically configuring a different plurality of energy configurations for the electronic device according to the different plurality of operation periods to regulate a maximum power of the processor, an operation mode of a backlight unit, a charging mode of a battery, and a peripheral energy management mode; and continuously collecting and learning a plurality of second operation data about the electronic device and autonomously updating and adjusting the plurality of operation periods and the plurality of energy configurations based on the plurality of second operation data.

The present invention further provides an energy consumption regulation method. The method includes: executing the following steps by a processor: continuously collecting and learning a plurality of first discharge current data of a battery included in an electronic device, and automatically distinguishing a discharge operation of the battery into a plurality of discharge periods accordingly; configuring a different plurality of charging configurations for the battery according to the different plurality of discharge periods; and continuously collecting and learning a plurality of second discharge current data of the electronic device, and automatically updating and adjusting the plurality of discharge periods and the plurality of charging configurations based on the second discharge current data.

The present invention further provides an energy consumption regulation method. The method includes: executing the following steps by a processor having a maximum power: executing an automatic power safety configuration logic as follows, when the electronic device is powered by the battery: limiting the maximum power to within 75% of a peak average power of the processor during a peak period, when the current time enters the peak period; limiting the maximum power to within 25% of a buffer average power of the processor during a buffer period, when the current time enters the buffer period; and limiting the maximum power to within 50% of a minimum value out of a plurality of time-unit average powers of the processor during the off-peak period, when the current time enters the off-peak period.

The present invention further provides an energy consumption regulation system. The system includes: an electronic device including a processor, wherein the processor is configured to: continuously collect and learn a plurality of first operation data about an electronic device, thereby automatically distinguishing an operation of the electronic device into a plurality of operation periods; automatically configure a different plurality of energy configurations for the electronic device according to the different plurality of operation periods to regulate a maximum power of the processor, an operation mode of a backlight unit, a charging mode of a battery, and a peripheral energy management mode; and continuously collect and learn a plurality of second operation data about the electronic device and autonomously update and adjust the plurality of operation periods and the plurality of energy configurations based on the plurality of second operation data.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation according to the present invention and many of the attendant advantages thereof are readily obtained as the same become better understood by reference to the following detailed description when considered in connection with the accompanying drawing, wherein.

DETAILED DESCRIPTION

Figure 1:
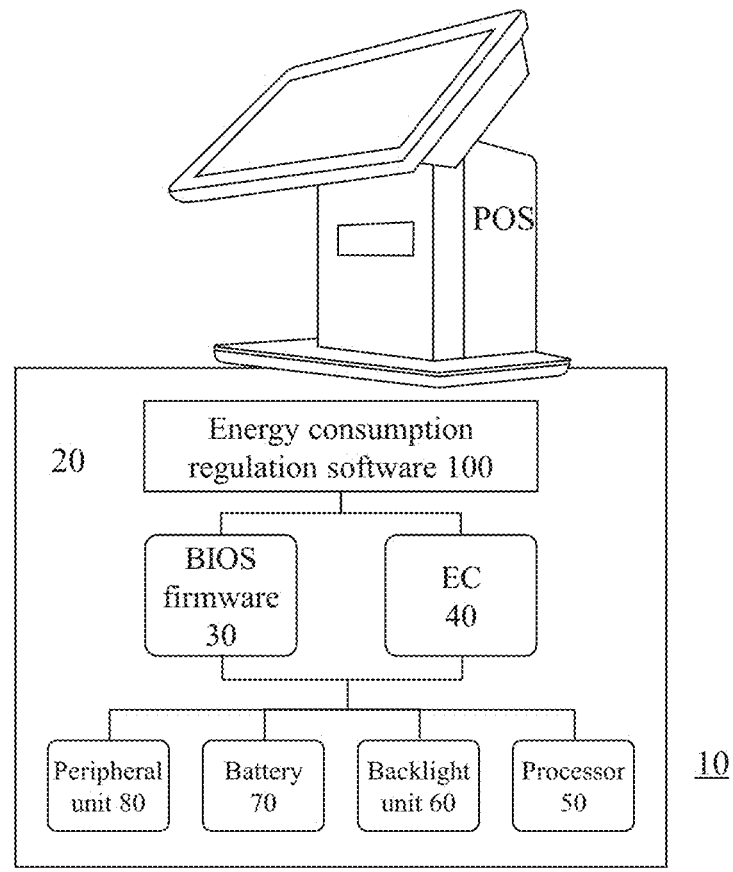
FIG. 1 is a schematic diagram illustrating the system architecture for the energy consumption regulation system according to the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice. It is clear that other embodiments can be configured according to the knowledge of persons skilled in the art without departing from the authentic technical teaching of the present disclosure, the claimed disclosure being limited only by the terms of the appended claims.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

FIG. 1 is a schematic diagram illustrating the system architecture for the energy consumption regulation system according to the present invention. The energy consumption regulation method according to the present invention is preferably implemented in the form of energy consumption regulation software 100 running on the energy consumption regulation system 10. The energy consumption regulation system 10 includes at least one electronic device 20 and the energy consumption regulation software 100, which is installed on the electronic device 20 and runs autonomously in the background under the operating system (OS) on the electronic device 20. The internal components configured within the electronic device 20 include the basic input/output system (BIOS) firmware 30, the embedded controller (EC) 40, the processor 50, the backlight unit 60, the battery 70, and the peripheral unit 80.

The energy consumption regulation software 100 has control authority superior over the BIOS firmware 30 and the embedded controller 40. The energy consumption regulation software 100 controls the BIOS firmware 30 and the embedded controller 40 to control the performance of components including but not limited to, the processor 50, the backlight unit 60, the battery 70, and the peripheral unit 80. After executing the energy consumption regulation software 100, it can perform fully automatic or semi-automatic continuous control for the electronic device 20, providing different configurations and controls for the performance and energy consumption of the electronic device 20 in different operation periods, such as peak and off-peak, thereby reducing the overall energy consumption of the electronic device.

The electronic device 20 widely covers various hardware equipment, in particular industrial computer equipment and consumer electronic products, including but not limited to: a point of service (POS) machine, a panel personal computer (PPC), a multimedia information terminal (Kiosk), an embedded computer (Box PC), an industrial computer, a medical computer, a medical workstation, a ticket vending machine, a vending machine, an automated teller machine (ATM), a cloud server, a tablet computer, a tablet device, a laptop, a personal computer (PC), and a workstation, etc. The operating system covers, but is not limited to: WINDOWS, Android, Linux, and iOS, etc.

Figure 2:
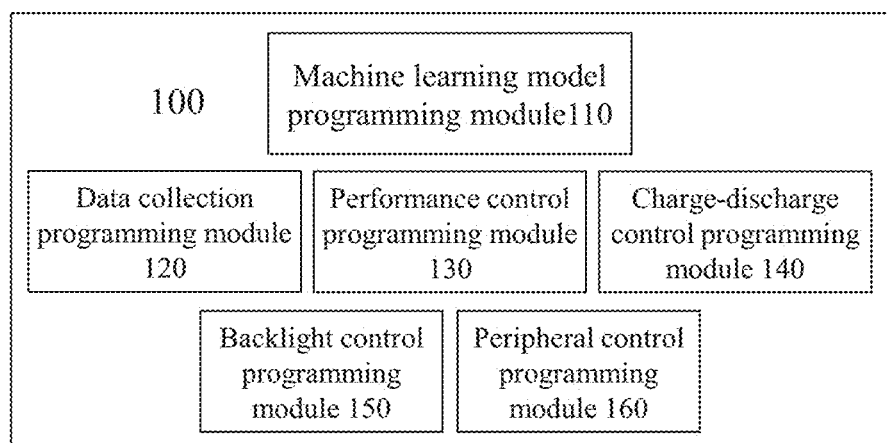
FIG. 2 is a schematic diagram illustrating the energy consumption regulation software and programming modules included therein according to the present invention.

FIG. 2 is a schematic diagram illustrating the energy consumption regulation software and programming modules included therein according to the present invention. The energy consumption regulation software 100 includes a machine learning model programming module 110, a data collection programming module 120, a performance control programming module 130, a charge-discharge control programming module 140, a backlight control programming module 150, and a peripheral control programming module 160.

The energy consumption regulation method proposed in the present invention is configured to continuously, intensively, and extensively detect and record various operation data for an electronic device under the operation of a specific user through the data collection programming module 120. A machine learning model included in the machine learning model programming module 110 is then trained to learn the collected operation data. Accordingly, the system learns and analyzes the user's habits and preferences, as well as the usage patterns and load cycles for the electronic device. For each user of the electronic device, the method is capable of deriving system performance configurations that satisfy processing requirements while also achieving energy saving effects, as well as personalized energy saving configurations.

In the initial phase of the operation data collection and model training, the types of operation data recorded and harvested according to the present invention include, but are not limited to: processor unit status data, power status data, battery status data, peripheral device usage data, and user usage habit data, and are used to train the machine learning model. After the machine learning model is successfully built and executed online, the data collection programming module 120 reads and records more new operation data by, for example, calling and executing relevant functions, libraries, or components provided by the operating system to periodically update and adjust the machine learning model being executed online.

For example, the processor unit status data collected according to the present invention includes various operation power consumptions, including, but not limited to: CPU load, GPU power, IA power, and CPU package power. The CPU load includes the ratio of the number of pending and processing threads in the processor. The GPU power is the power consumed by the graphics processor built into the CPU. The IA power is the total power consumed by the executing CPU cores (Intel Architecture, IA). The CPU package power is the average maximum total power consumed by the current CPU.

For example, in the Windows operating system, the data collection programming module 120 is configured to read the aforementioned processor unit status data by calling the GetSystemPowerStatus function provided by the Win32 API, record the read data at a sampling rate such as every 1 second, and then average and store the records every 3 seconds to reduce significant differences caused by instantaneous outliers, thereby ensuring the accuracy of the data.

For example, the power status data collected according to the present invention includes, but is not limited to: electric current value, power supply mode, power supply mode duration, power supply mode switching time, startup time, and shutdown time. The electric current value includes the discharge current value and the system operating current value. The data of the electric current value data is divided into three states: the first state is a positive value indicating that the power is supplied by alternating current; the second state is a zero value indicating that the alternating current is connected and the battery is fully charged; and the third state is a negative value indicating that the power is supplied by direct current. The power supply mode is further divided into a direct current (DC) supply mode and an alternating current (AC) supply mode. The power supply mode duration is calculated from the power supply mode switching time. For example, subtracting two switching times gives the duration of the previous power supply mode.

For example, the battery status data collected by the present invention includes, but is not limited to: design capacity, full charge capacity, current capacity, discharge current value, battery charging and discharging behavior data. The records of the battery include, but are not limited to: daily charging time of the battery and daily discharging time of the battery. The records of the power supply time include, but are not limited to: daily usage time of the power supply. The user usage habit data include, but are not limited to: the start time the user begins using the system each day, and the end time the user ends using the system each day. When the energy consumption regulation software 100 receives these battery status data, it applies the battery information conversion formula as follows to convert these battery status data into battery health and battery percentage information, which are provided to the user for reference.

The battery health and battery percentage are calculated according to the following formulas respectively:

$$\text{Battery Health} = \frac{\text{Full Charge Capacity}}{\text{Design Capacity}} \times 100\% \qquad (1)$$

$$\text{Battery Percentage} = \frac{\text{Current Capacity}}{\text{Full Charge Capacity}} \times 100\% \qquad (2)$$

For example, the peripheral device usage data collected by the present invention includes, but is not limited to: usage time of peripheral devices, records of peripheral device resource usage, and power consumption of peripheral devices. For example, the user usage habit data collected by the present invention includes, but is not limited to: the start time the user begins using the system each day, and the end time the user ends using the system each day.

Figure 3:
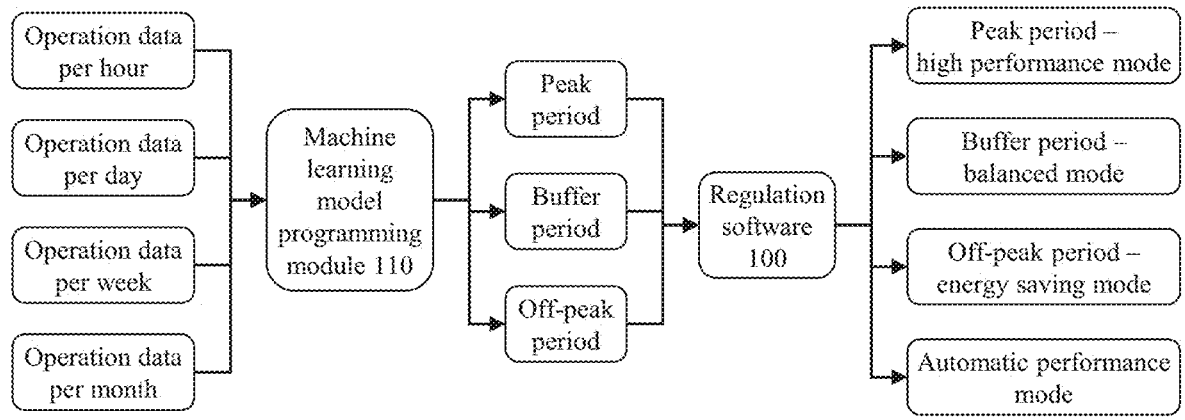
FIG. 3 is a block diagram illustrating the learning architecture for the machine learning model according to the present invention.
Figure 4:
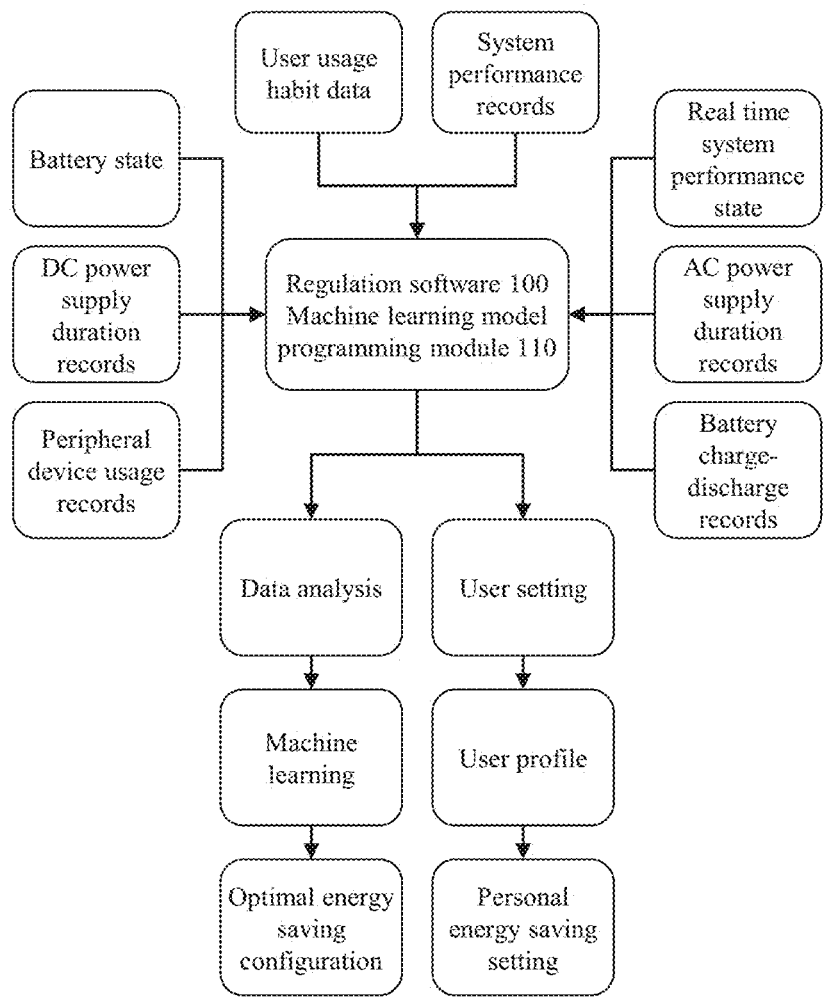
FIG. 4 is a block diagram illustrating the software architecture for the energy consumption regulation software according to the present invention.

FIG. 3 is a block diagram illustrating the learning architecture for the machine learning model according to the present invention. FIG. 4 is a block diagram illustrating the software architecture for the energy consumption regulation software according to the present invention. In the data preprocessing stage, the collected initial operation data (or the first operation data) of the electronic device associated to a particular user is preprocessed with different cycles. In one embodiment, the operation data is classified into different groups based on different cycles such as hours, days, weeks, and months, and then the corresponding average value for each cycle is computed. Next, the machine learning model is trained using either the initial operation data or the averaged operation data. The training process involves dividing the operation data into a training dataset, a validation dataset, and a test dataset. The machine learning model is trained by using the training dataset, and validated and tuned by using the validation dataset, and its performance is confirmed by using the test dataset.

The machine learning model programming module 110 included in the present invention preferably includes, but is not limited to: an artificial neural network (ANN) model, a deep neural network (DNN) model, a convolutional neural network (CNN) model, a recurrent neural network (RNN) model, a gated recurrent unit (GRU) model, a long short-term memory (LSTM) model, a multi-layer perceptron (MLP) model, a boosting models, a gradient boosting model, an extreme gradient boosting model, a weak gradient boosting model, a moving average model, an exponential smoothing model, an autoregressive integrated moving average (ARIMA) model, a regression tree models, a decision tree models, a random forest models, a weak learning models, a strong learning model, a weak voting models, a strong voting model, a support vector machine (SVM) model, an unsupervised machine learning model, a supervised machine learning model, a semi-supervised machine learning model, an ensemble learning model, or a combination thereof.

The machine learning model included in the present invention possesses a self-learning mechanism based on self-feedback or reinforcement learning. After the model is correctly deployed and executed, it continuously learns the newly collected operation data (or the second operation data) that was not included in the initial operation data (either the first operation data) during the device operation. The machine learning model is periodically updated with the newly collected operation data (either the second operation data), so to adapt to any changes in the device operation cycle. After running for a proper period of time, the energy consumption regulation software 100 according to the present invention is capable of identifying the optimal energy saving configuration for the electronic device 20 and ready for the system to access, and identify the energy configuration for each individual user and store it as a user profile to establish personalized energy saving settings for the individual user to access.

After the machine learning model is successfully trained and built, the energy consumption regulation software 100 included in the present invention is capable of automatically identifying the usage patterns and operation cycles for electronic device or individual users through the computation and analysis by the machine learning model. In partiular, it has the capability to identify and distinguish a high load peak period, a medium load buffer period, and a low load off-peak period for device operation, and automatically applies appropriate energy configurations for the electronic device according to different operation periods. It can also identify and distinguish a high discharge period, a medium discharge period, and a low discharge period for battery discharge, and set up appropriate charging modes for the battery according to different discharge periods, as to achieve the effect of reducing the overall energy consumption for the electronic device. Since the machine learning model included in the present invention has a self-learning mechanism, it has the ability to continuously learn and dynamically adjust these configurations and controls in response to constantly changing usage situations and scenarios In one embodiment, the electronic device 20 is preferably a point of service (POS) device, and the user is an administrator. After the machine learning model included in the present invention is executed on the electronic device 20, the operation of the electronic device 20 is automatically divided into different operation periods on the timeline. These operation periods include, but are not limited to: a peak period, a buffer period, and an off-peak period, and during different operation periods, different performance modes are automatically configured for the processor within the electronic device 20. In addition, the discharge period for the battery is also automatically divided into a low discharge period, a medium discharge period, and a high discharge period, and different discharge periods, different charging modes are automatically configured for the battery within the electronic device 20.

In one embodiment, the performance control programming module 130 provides the processor with at least three different performance modes, including but not limited to: a high performance mode, a balance mode, and a energy saving mode, to correspond to the processing requirements during different operation periods. The performance control programming module 130 also provides an automatic performance mode, which automatically selects an appropriate performance mode for the electronic device 20 based on the current load condition.

In one embodiment, in the high performance mode, the performance control programming module 130 limits the maximum power of the CPU to 90% of thermal design power (TDP) specified by the CPU manufacturer plus a tolerance value, and fine tunes the maximum power added with the tolerance value with a fine tuning value, which is adjusted in real time based on the currently detected processor load and frequency. The tolerance value is in a range between ±10%, and the fine tuning value is in a range within ±2%. The fine tuning value is determined under the following conditions: when the processor load is high and the processor frequency is high, the fine tuning value is set to +2%, and when the processor load is low and the processor frequency is low, the fine tuning value is set to −1%.

In the high performance mode, the performance control programming module 130 is configured to allow the maximum power of the CPU to float within a range of 90% of thermal design power specified by the CPU manufacturer plus the tolerance value and further fine tune the maximum power with the fine tuning value. That is to say, in the high performance mode, the maximum power is preliminarily limited to a range of 80% to 100% of the TDP, and dynamically fine tuned by 1% or 2% of power in real time based on the current CPU load condition.

For example, if the TDP is 6.5 W, in the high performance mode, the performance control programming module 130 initially limits the maximum power of the CPU to about 5.85 W (6.5×90%≈5.85 W). Then, when the CPU is in a high load and high frequency state, the module 130 further fine tunes the maximum power to about 5.98 W (6.5×(90%+2%)≈5.98 W). When the CPU state changes to low load and low frequency, the module 130 further fine tunes the maximum power to about 5.915 W (6.5×(92%−1%)≈5.915 W). All fine tuned maximum power values stop tuning when they reach the upper limit of 6.5 W (6.5×100%≈6.5 W) or the lower limit of 5.2 W (6.5×80%≈5.2 W). Such a fine tuning scheme does not significantly impact the user experience because of its tiny difference but it does achieve the purpose of energy saving.

In some embodiments, in the balance mode, the performance control programming module 130 is configured to allow the maximum power of the CPU to float within a range of 70% of thermal design power specified by the CPU manufacturer plus the tolerance value and further fine tune the maximum power with the fine tuning value. That is to say, in the balance mode, the maximum power is initially limited to a range of 60% to 80% of the TDP, and dynamically fine tuned by 1% or 2% of power in real time based on the current CPU load condition. For example, if the TDP is 6.5 W, in the balance mode, the module 130 initially limits the maximum power to about 4.55 W (6.5×70%≈4.55 W). Depending on the CPU load condition in real time, the module 130 may further fine tune the maximum power by the fine tuning value to, for example, 4.68 W (6.5×(70%+2%)≈4.68 W) or 4.81 W (6.5×(72%+2%)≈4.81 W), within a power range between the upper limit of 5.2 W (6.5×80%≈5.2 W) and the lower limit of 3.9 W (6.5×60%≈3.9 W).

In some embodiments, in the energy saving mode, the performance control programming module 130 is configured to allow the maximum power of the CPU to float within a range of 60% of thermal design power specified by the CPU manufacturer plus the tolerance value and further fine tune the maximum power with the fine tuning value. That is to say, in the energy saving mode, the maximum power is initially limited to a range of 50% to 70% of the TDP, and dynamically fine tuned by 1% or 2% of power in real time based on the current CPU load condition. For example, if the TDP is 6.5 W, in the energy saving mode, the module 130 first limits the maximum power to about 3.9 W (6.5×60%≈3.9 W). Depending on the CPU load condition in real time, the module 130 may further fine tune the maximum power to, for example, 3.835 W (6.5×(60%−1%)≈3.835 W) or 3.77 W (6.5×(59%−1%)≈3.77 W), within a power range between the upper limit of 4.55 W and the lower limit of 3.25 W.

In some embodiments, the performance control programming module 130 is configured to control the overall power (package power) of the processor by setting and configuring the model specific registers (MSR) of the processor, for example, to achieve the effect of controlling the maximum power of the processor. Furthermore, since the energy consumption regulation software 100 has the control authority that is higher than that of the BIOS firmware 30, any user can adjust the maximum power of processor in the electronic device 20 through operating the user-friendly and easy-to-use energy consumption regulation software 100.

In one embodiment, the peak period, the buffer period, and the off-peak period of operation of an electronic device preferably have a high correlation with the application area, the industry classification, and the field of use of the electronic device.

In one embodiment, for example, the user is an administrator, and the electronic device is a point of service (POS) device, used in the catering industry, and located in the venue of a department store. After learning and analysis by the machine learning model, it is found that the peak period of the POS device falls between 12:00 and 20:00, the buffer period falls between 08:00 and 12:00, and the off-peak period falls between 20:00 and 08:00.

Figure 5:
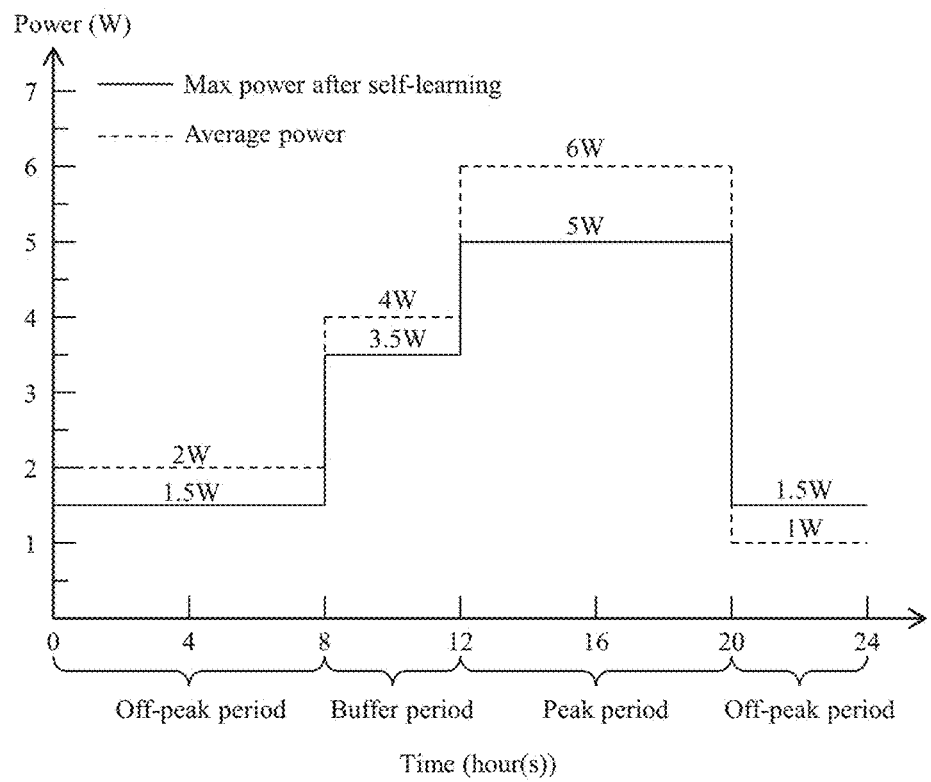
FIG. 5 is a schematic diagram of a power duration curve illustrating the automatic performance control for the processor during different operation periods by the energy consumption regulation software according to the present invention.

FIG. 5 is a schematic diagram of a power duration curve illustrating the automatic performance control for the processor during different operation periods by the energy consumption regulation software after self-learning according to the present invention. In one embodiment, by learning and analysis by the machine learning model, it is found that the average processor power of the POS device is 2 W from 0:00 to 08:00, 4 W from 08:00 to 12:00, 6 W from 12:00 to 20:00, and 1 W from 20:00 to 24:00. Therefore, the machine learning model estimates the peak period as starting at 12:00 and ending at 20:00, the buffer period as 08:00 to 12:00, and the off-peak period as 20:00 to 08:00.

In one embodiment, in the automatic performance mode, after a period of execution and self-reinforcement learning, the performance control programming module 130 may find that there is still room to reduce the maximum power of the CPU during the off-peak and buffer periods. Therefore, during the off-peak period, the maximum power is further reduced to about 1.5 W, and during the buffer period, the maximum power is further reduced to about 3.5 W. Because the performance demands during these periods are very low, such minor power adjustments do not affect the user experience. However, over a long run, they can contribute to better power savings.

For the peak period, after a period of execution and self-learning, the performance control programming module 130 may learn that although the maximum power has been limited to 5.2 W during the peak period, users do not appear to have any adverse reactions and have not changed the relevant settings on the energy consumption regulation software 100. Then the performance control programming module 130 keeps fine tuning the maximum power, for example, further reducing it to 5 W. Such fine tuning has a minimal impact on CPU performance, and users may further adapt to the newly tuned performance. Thus, a reduction in CPU power consumption can be achieved while maintaining the user experience without compromising performance.

In one embodiment, in the automatic performance mode, when electronic device 20 is operating in a battery powered DC mode, the performance control programming module 130 is configured to configure the maximum power of the CPU according to an automatic power safety configuration logic that the performance control programming module 130 dynamically adjusts the maximum power of the CPU based on the battery percentage of the battery 70.

The automatic power safety configuration logic is primarily to ensure that the electronic device 20 can maintain or reserve as much battery power as possible, which is sufficient to operate normally and to support the execution of basic daily business operations, when the operation of the electronic device 20 is going to enter and enters the peak period. According to the logic, during the peak period, the maximum power of the processor is intentionally further reduced to make the user feel that the system is slowing down to remind the user to replace the battery. It is assumed that during the off-peak period and the following buffer period, there is a high probability that the electronic device 20 is not operated most of the time and is in an idle state. Even if the electronic device 20 is operated, it is assumed that the operation is usually a quick and easy operation. Moreover, it is also assumed that when the electronic device 20 enters the peak period, the user will find that the battery level is low and take corresponding action.

Therefore, when the electronic device 20 is in the off-peak period, including when it has just entered the off-peak period, if the performance control programming module 130 detects that the battery percentage is below about 50% to 40%, it configures the maximum power of the CPU according to the automatic power safety configuration logic as follows:

For the peak period: CPU maximum power=within the average power consumption in the peak period×75%;

For the buffer period: CPU maximum power=within the average power consumption in the buffer period×25%; and For the off-peak period: CPU maximum power=within a minimum value of multiple time-unit average power consumptions in the off-peak period×50%.

Figure 6:
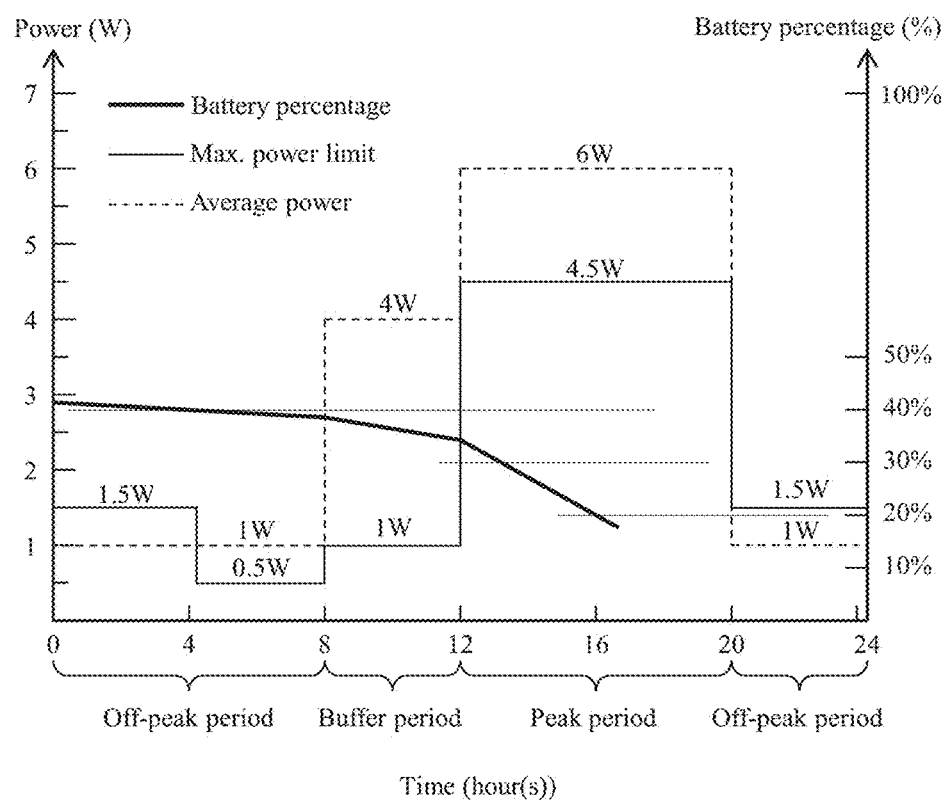
FIG. 6 is a schematic diagram of a power duration curve illustrating the automatic performance control for the processor during different operation periods by the energy consumption regulation software after self-learning according to the present invention.

FIG. 6 is a schematic diagram of a power duration curve illustrating the automatic performance control for the processor according to the automatic power safety configuration logic under the automatic performance mode by the energy consumption regulation software according to the present invention. In one embodiment, by learning and analysis by the machine learning model, it is found that the average processor power of the POS device is 1 W from 0:00 to 08:00, 4 W from 08:00 to 12:00, 6 W from 12:00 to 20:00, and 1 W from 20:00 to 24:00. Therefore, the machine learning model estimates the peak period as starting at 12:00 and ending at 20:00, the buffer period as 08:00 to 12:00, and the off-peak period as 20:00 to 08:00.

For example, the performance control programming module 130 detects that the battery percentage falls below 40% at 4:15. The performance control programming module 130 is configured to immediately further reduce the maximum power from 1.5 W to 0.5 W (1 W×50%). When the current time enters the buffer period, the performance control programming module 130 is configured to limit the maximum power to 1 W (4 W×25%), providing only the necessary power to maintain the basic operation of the system, ensuring that the electronic device 20 still has enough power to support the daily basic business operations after entering the peak period.

After the current time enters the peak period, the performance control programming module 130 is configured to limit the maximum power to 4.5 W (6 W×75%), which is sufficient to support the daily basic business operations. However, it can remind the user to feel that the system is slowing down. Together with the low battery warning issued by the system, the user replaces the battery at 16:45.

Battery life is affected whether the battery charge level is too low or too high. Properly charging the battery can effectively extend the life of the battery. Therefore, the charge-discharge control programming module 140 is configured to provide different charging modes for the battery according to the different discharge periods of the battery, including but not limited to: a highest capacity charging mode to charge the battery in the high discharge period of the battery; a balanced charging mode to charge the battery in the medium discharge period of the battery; and an optimal battery life charging mode to charge the battery in the low discharge period of the battery, to accommodate the different charging needs during different discharge periods. The charge-discharge control programming module 140 is also configured to provide an automatic charging mode to automatically configure the appropriate charging mode for the battery.

In one embodiment, the machine learning model is configured to computes different average discharge current values for different combinations of cycles based on the recorded discharge current values, and compare them to the records of battery charging and discharge behaviors, and then distinguish the discharge behaviors into the three different discharge periods, including but not limited to: a low discharge period, a medium discharge period, and a high discharge period. In the different discharge period, the charge-discharge control programming module 140 is configured to charge the battery with different charging modes. Preferably, when the battery is in the low discharge period, the charge-discharge control programming module 140 is configured to charge the battery 70 with the optimal battery life charging mode. When the battery 70 is in the medium discharge period, the charge-discharge control programming module 140 is configured to charge the battery with the balanced charging mode. When the battery 70 is in the high discharge period, the charge-discharge control programming module 140 is configured to charge the battery with the highest capacity charging mode.

In one embodiment, the highest capacity charging mode provided by the charge-discharge control programming module 140 is configured to set the charging limit up to 100% of the design capacity of the battery 70. The balanced charging mode is configured to set the charging limit to 80% of the design capacity. The optimal battery life charging mode is configured to set the charging limit to 60% of the design capacity.

In one embodiment, the low discharge period, the medium discharge period, and the high discharge period of the battery 70 preferably have a high correlation with the peak period, the buffer period, and the off-peak period of the electronic device 20. Preferably, the low discharge period, the medium discharge period, and the high discharge period may coincide with, but not necessarily coincide with, the peak period, the buffer period, and the off-peak period.

Figure 7:
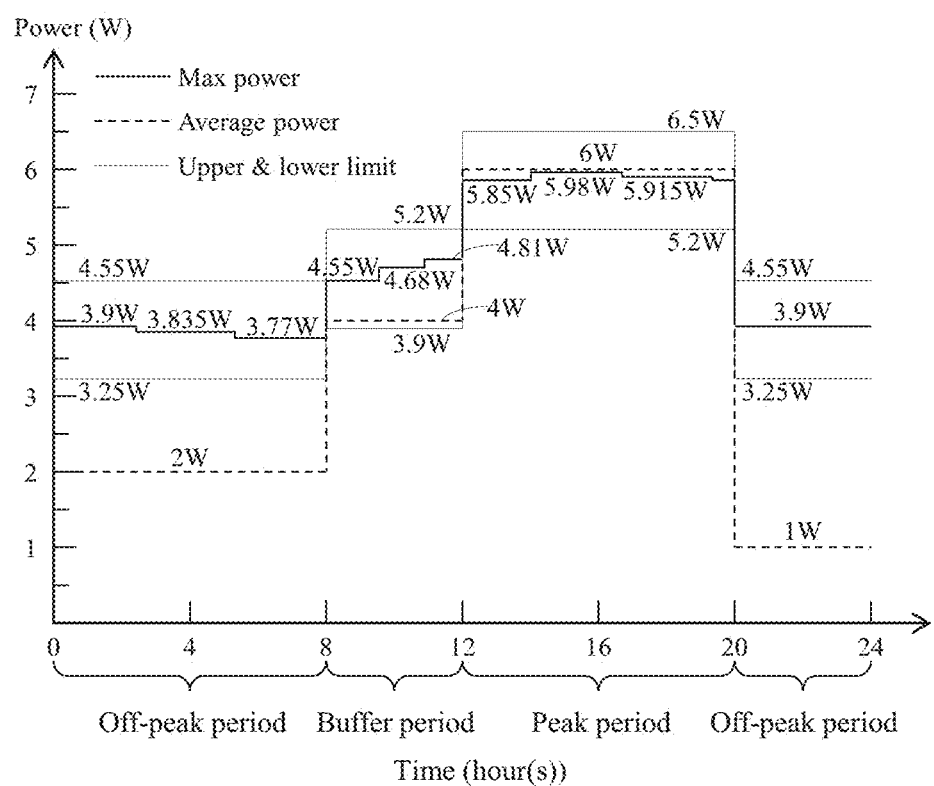
FIG. 7 is a schematic diagram of a power duration curve illustrating the automatic performance control for the processor according to the automatic power safety configuration logic under the automatic performance mode by the energy consumption regulation software according to the present invention.

FIG. 7 is a schematic diagram of a power duration curve illustrating the automatic performance control for the processor during different operation periods by the energy consumption regulation software according to the present invention. By learning and analysis by the machine learning model, it is found that the average processor power of the POS device is 2 W from 0:00 to 08:00, 4 W from 08:00 to 12:00, 6 W from 12:00 to 20:00, and 1 W from 20:00 to 24:00. Therefore, the machine learning model estimates the peak period as starting at 12:00 and ending at 20:00, the buffer period as 08:00 to 12:00, and the off-peak period as 20:00 to 08:00.

According to the data, the TDP of the processor in the point of service (POS) device is 6.5 W. Therefore, when the current time enters the peak period, the performance control programming module 130 is configured to switch the CPU into the high performance mode and limit the maximum power of the CPU to about 90% of the TDP, which is about 5.85 W. Although this setting power is slightly lower than the actual power demand of the CPU operating during the peak period, the difference is small enough to not affect the user experience, but achieving the purpose of energy saving. For example, throughout the entire peak period, the maximum power of the CPU is fine tuned between the upper limit of 6.5 W and the lower limit of 5.2 W, and may be fine tuned to values such as 5.98 W or 5.915 W depending on the situation.

During the buffer period, the performance control programming module 130 is configured to switch the CPU into the balance mode and limit the maximum power of the CPU to about 70% of the TDP, which is about 4.55 W. For example, throughout the entire buffer period, the maximum power of the CPU is fine tuned between the upper limit of 5.2 W and the lower limit of 3.9 W, and may be fine tuned to values such as 4.68 W or 4.81 W depending on the situation.

During the off-peak period, the performance control programming module 130 is configured to switch the CPU into the energy saving mode and limit the maximum power of the CPU to about 60% of the TDP, which is about 3.9 W. For example, throughout the entire off-peak period, the maximum power of the CPU is fine tuned between the upper limit of 4.55 W and the lower limit of 3.25 W, and may be fine tuned to values such as 3.835 W or 3.77 W depending on the situation.

In one embodiment, in the automatic performance mode, when the electronic device 20 is powered by an AC power supply, the performance control programming module 130 is configured to set the maximum power of the CPU according to the automatic power configuration logic as follows:

For the peak period: CPU maximum power=average power consumption in the peak period+0.5 w or within +10%;

For the buffer period: CPU maximum power=average power consumption in the buffer period; and For the off-peak period: CPU maximum power=maximum value of multiple time-unit average power consumptions in the off-peak period.

Therefore, in one embodiment, in the automatic performance mode, the performance control programming module 130 is configured to limit the maximum power of the CPU during the peak period to 6 W+0.5 W=6.5 W, limit it to 4 W during the buffer period, and limit it to 2 W during the off-peak period.

In one embodiment, in the automatic performance mode, after a period of execution, benefiting from the self-learning mechanism, the performance control programming module 130 will autonomously find out that during the off-peak period the maximum power of the CPU is limited to about 3.3 W, which is still relatively high as compared to the average power consumption of 2 W during the off-peak period, and can be further reduced. Furthermore, during the buffer period, the maximum power of the CPU is limited to about 4.0 W, which is still relatively high as compared to the average power consumption of 4.0 W during the off-peak period.

Figure 8:
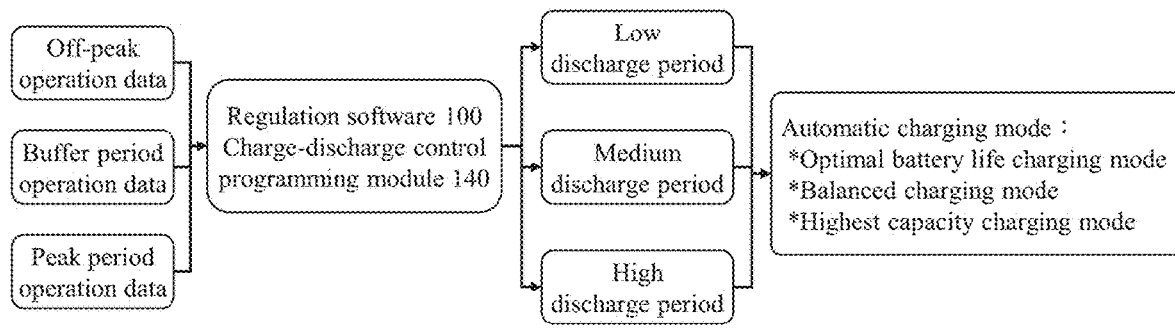
FIG. 8 is a block diagram illustrating the automatic charging mode executed by the charge-discharge control programming module according to the present invention to configure different charging modes for the electronic device in different operation periods and different discharge periods.

FIG. 8 is a block diagram illustrating the automatic charging mode executed by the charge-discharge control programming module according to the present invention to configure different charging modes for the electronic device in different operation periods and different discharge periods. In one embodiment, the charge-discharge control programming module 140 is configured to perform the automatic charging mode that automatically recognizes the peak period as the high discharge period for the battery, and configures the highest capacity charging mode for charging the battery, recognizes the buffer period as a medium discharge period for the battery and configures the balanced charging mode for charging the battery, and recognizes the off-peak period as a low discharge period for the battery and configures the optimal battery life charging mode for charging the battery.

Figure 9:
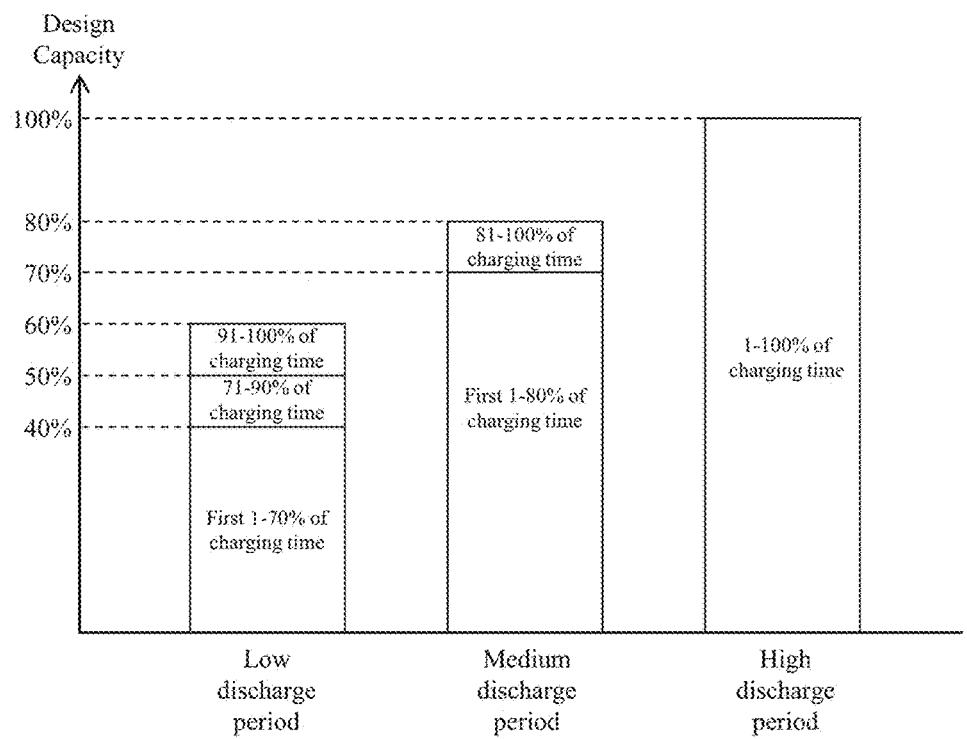
FIG. 9 is a block diagram illustrating the respective charging curves for the respective charging modes performed by the charge-discharge control programming module according to the present invention.

FIG. 9 is a block diagram illustrating the respective charging curves for the respective charging modes performed by the charge-discharge control programming module according to the present invention. In one embodiment, the basic charging logic followed by the charge-discharge control programming module 140 is slow discharge and slow charge. That is to say, when the battery is in a slow discharge or slow rate discharge state, it charges the battery at a relatively slow rate. In contrast, when the battery is in a fast discharge state, it charges the battery at a relatively fast rate. The charging logic that each charging mode follows is described as follows.

In one embodiment, during the low discharge period, the charge-discharge control programming module 140 is configured to charge the battery according to the optimal battery life charging mode. The charging logic includes: for the first 70% of the charging time, the charging limit is set to 40%; for the next 20%, either from 71% to 90%, of the charging time, the charging limit is increased to 50%; and for the last 10%, either from 91% to 100%, of the charging time, the charging limit is further increased to 60%. When the battery is in the low discharge period, it indicates that the electronic device has a lower power requirement, so it is charged slowly to protect the battery.

In one embodiment, during the medium discharge period, the charge-discharge control programming module 140 is configured to charge the battery according to the balanced charging mode. The charging logic includes: for the first 80% of the charging time, the charging limit is set to 70%, and for the remaining 20%, either from 81% to 100%, of the charging time, the charging limit is increased to 80%. This type of setting both protects the battery and provides sufficient power to support the routine operation of the electronic device.

In one embodiment, during the high discharge period, the charge-discharge control programming module 140 is configured to charge the battery according to the highest capacity charging mode. The charging logic includes: during this high discharge period, because it indicates that the electronic device has a higher power demand, the charging limit is set up to 100% for the entire charging duration to ensure that the electronic device has sufficient power supply.

In one embodiment, under the automatic charging mode, the charge-discharge control programming module 140 is configured to follow the following different charging logics corresponding to different charging modes for different discharge periods:

In the low discharge period/time (LDT), the following optimal battery life charging logic corresponding to the optimal battery life charging mode is applied:

$$CUL_L = HC \times \frac{60}{100} \tag{3}$$

$$\text{When } T_L \leq 0.7LDT \rightarrow CUL_{T_L} = CUL_L \times \frac{40/60}{100} \tag{4}$$

$$\text{When } 0.7LDT < T_L \leq 0.9LDT \rightarrow CUL_{T_L} = CUL_L \times \frac{50/60}{100} \tag{5}$$

$$\text{When } T_L > 0.9LDT \rightarrow CUL_{T_L} = CUL_L \tag{6}$$

The $CUL_L$ is the charging limit in the low discharge period, the HC is the current full charge capacity, the $T_L$ is the current time in the low discharge period, and the $CUL_{T_L}$ is the current charging level.

In the medium discharge period/time (MDT), the following balanced charging logic corresponding to the balanced charging mode is applied:

$$CUL_M = HC \times \frac{80}{100} \tag{7}$$

$$\text{When } T_M \leq 0.8MDT \rightarrow CUL_{T_M} = CUL_M \times \frac{70/80}{100} \tag{8}$$

-continued $$\text{When } T_M > 0.8MDT \rightarrow CUL_{T_M} = CUL_M \qquad (9)$$

The $CUL_M$ is the charging limit in the medium discharge period, the HC is the current full charge capacity, the $T_M$ is the current time in the medium discharge period, and the $CUL_{T_M}$ is the current charging level.

In the high discharge period/time (HDT), the following highest capacity charging logic corresponding to the highest capacity charging mode is applied:

$$\text{When } T_H \leq 1HDT \rightarrow CUL_{T_H} = CUL_H \qquad (10)$$

The $CUL_H$ is the charging limit in the high discharge period, the $T_H$ is the current time in the high discharge period, and the $CUL_{T_H}$ is the current charging level.

During actual implementation, the charge-discharge control programming module 140 is configured to set the charging mode by sending an instruction containing a message specifying the charging mode and the charging limit to the embedded controller 40 via the energy consumption regulation software 100. The embedded controller 40 then sets the charging limit for the battery 70 according to the instruction and charges the battery 70 according to the corresponding charging curve for the charging mode.

Figure 10:
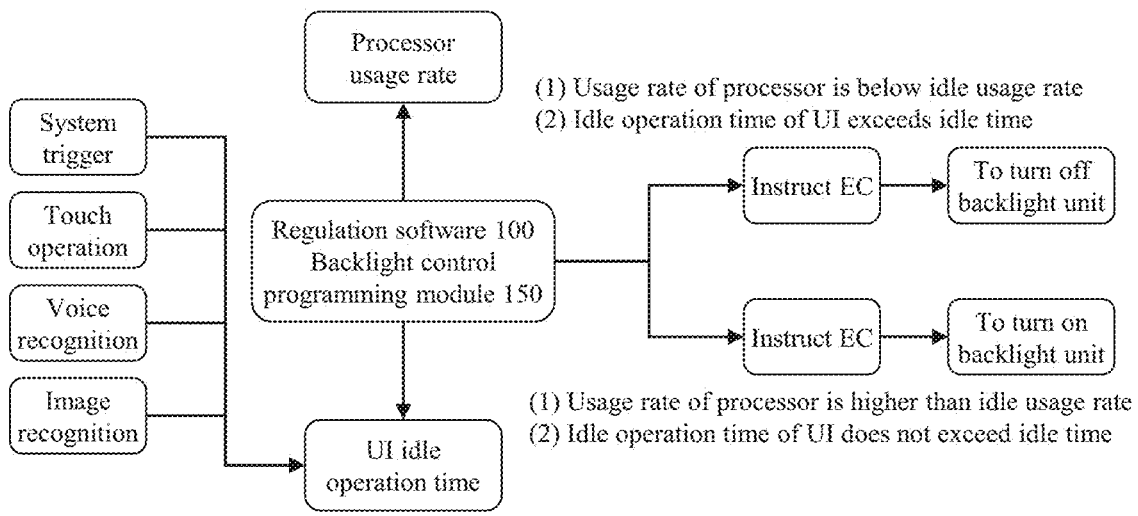
FIG. 10 is a block diagram illustrating the backlight control logic followed by the backlight control programming module according to the present invention to activate and deactivate the backlight unit.

FIG. 10 is a block diagram illustrating the backlight control logic followed by the backlight control programming module according to the present invention to activate and deactivate the backlight unit. In one embodiment, the backlight control programming module 150 is configured to have a superior control authority to turn on or turn off the backlight unit 60, and to control the backlight unit 60 through a backlight energy management mode. The backlight energy management mode is configured to automatically switch the backlight unit 60 within the display between an enabled state and a disabled state according to the current load and operation situations of the electronic device 20, thereby reducing the power consumption of the electronic device 20.

The backlight energy management mode includes that the backlight control programming module 150 is configured to autonomously detect whether or not two predetermined backlight deactivation conditions are fullfilled, in order to determine whether to deactivate the backlight unit in the display. The backlight deactivation conditions include: a usage rate of the processor is below an idle usage rate, and an idle operation time of a user interface (UI) exceeds an idle time. Only when both of the above two backlight deactivation conditions are fulfilled at the same time, the backlight control programming module 150 is triggered to send a backlight deactivation instruction to the embedded controller 40 via the energy consumption regulation software 100, instructing the embedded controller 40 to turn off the backlight unit 60 in the display.

In one embodiment, the counting of the idle operation time of the user interface is implemented by calling and executing the timer related functions provided by the operating system. When the user stops touching or operating the user interface, the backlight control programming module 150 is configured to start up the timer to count and accumulate the idle operation time until the next operation for the user interface begins. In the process of counting the idle operation time, as long as the accumulated idle operation time exceeds the idle time, for example, but not limited to 2 minutes, the backlight control programming module 150 determines that the idle operation time of the user interface exceeds the idle time and instructs to deactivate the backlight unit 60.

In one embodiment, the backlight control programming module 150 is configured to only deactivate the backlight unit 60 of the display and does not regulate any control over the processor 50 or the drivers and controllers within the display. The processor 50 and the drivers and controllers within the display remain unchanged in their respective operations. Thus, the activation and deactivation of the backlight unit 60 is independent of the operation period of the electronic device 20. For example, even if the electronic device is operating during the peak period, at any time when both backlight deactivation conditions are fulfilled, the backlight control programming module 150 is configured to immediately send a backlight deactivation instruction to deactivate the backlight unit 60, but the processor 50 still keeps operating in the high performance mode.

Since the backlight control programming module 150 is configured to only turn off the backlight unit 60 of the display and does not regulate any control over the processor 50 or the drivers and controllers within the display, there is no longer a need to perform additional preparation steps for the processor or the drivers and controllers within the display before entering a sleep mode or a wake-up mode when deactivating and restarting the display. Because the only requirement to activate and deactivate the backlight unit 60 is to turn the power to the backlight unit 60 on or off, the conventional preparation steps for the processor, drivers and controllers can be totally eliminated. Therefore, in one embodiment, the criteria for achieving the above two backlight deactivation conditions, including the idle usage rate and the idle time, are preferably set in an efficient and responsive manner, i.e., the idle usage rate can be set to a relatively higher value, e.g., 20%, 15%, 10%, 8%, 5% or lower, or other values set by the user, and the idle time is preferably set to a relatively smaller value, e.g., a very short period of 1-2 minutes or a shorter period of 2-4 minutes. Even if the idle time is set to 5 minutes, it is still significantly shorter than the conventional threshold time to enter a sleep mode for a typical display.

Since the power consumption of the backlight unit 60 is similar to that of the processor, both account for a higher proportion of the overall energy consumption of the electronic device 20. Therefore, it is sufficient to improve the energy waste caused by idle displays by efficiently turning off only the backlight unit, thereby reducing the overall power consumption of the electronic device 20.

In one embodiment, once the backlight unit 60 of the display is successfully turned off, the backlight control programming module 150 is configured to switch to determine whether multiple backlight activation conditions have been fulfilled, to determine whether to reactivate the backlight unit 60 to illuminate the display. The backlight activation conditions include, but are not limited to: the usage rate of the processor is higher than the idle usage rate, the user interface receives an operation instruction, a predefined voice pattern is recognized by a voice recognition module, a predefined image is recognized by an AI image recognition module, and other operations that may trigger system operation are detected. When one of the above backlight activation conditions is fulfilled, the backlight control programming module 150 is configured to instruct the embedded controller 40 to turn on the backlight unit.

For example, when the usage rate of the processor is higher than the idle usage rate, such as 10% or more, the backlight control programming module 150 is configured to turn on the backlight unit 60 to illuminate the display; when the touch screen receives a touch operation, the backlight control programming module 150 is configured to turn on the backlight unit 60 to illuminate the display; when the voice recognition module recognizes the detected sound matches the predefined voice pattern, the backlight control programming module 150 is configured to turn on the backlight unit 60 to illuminate the display; when the AI image recognition module recognizes the face as an authorized person, the backlight control programming module 150 is configured to turn on the backlight unit 60 to illuminate the display; or when other operations triggering system operation are detected, the backlight control programming module 150 is configured to turn on the backlight unit 60.

Figure 11:
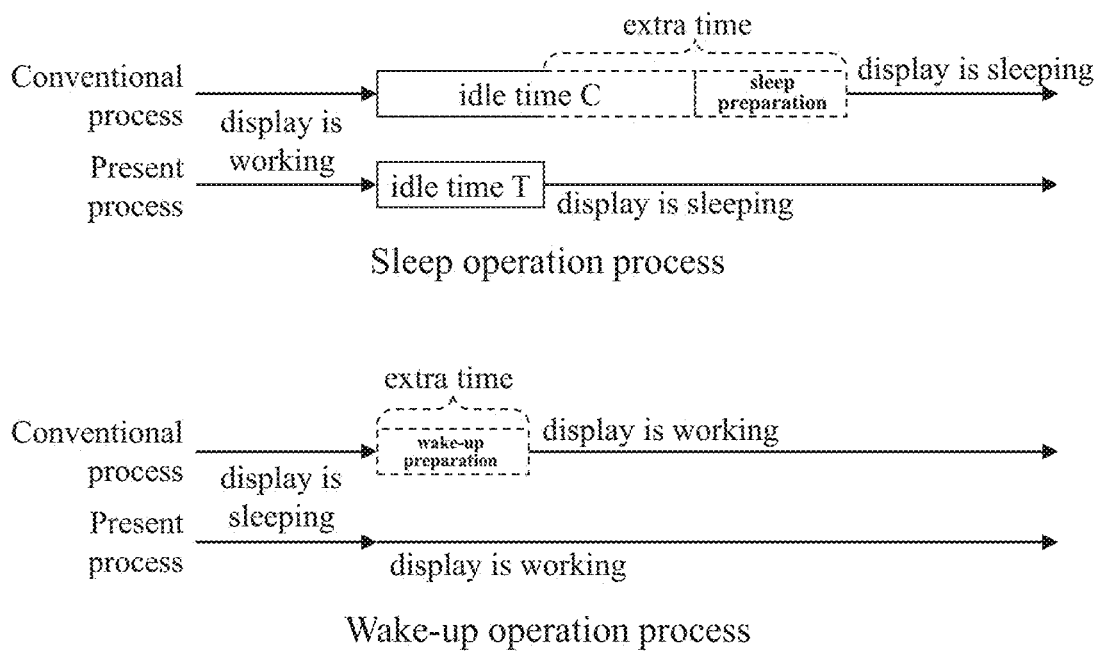
FIG. 11 is a schematic diagram illustrating a comparison between the sleep and wake-up operation process of the display according to power management of the present invention and the sleep and wake-up operation process used by power management of a conventional display.

FIG. 11 is a schematic diagram illustrating a comparison between the sleep and wake-up operation process of the display according to power management of the present invention and the sleep and wake-up operation process used by power management of a conventional display. The sleep operation process used by a conventional display is introduced as follows: when it is confirmed that the display has reached the predetermined idle time C, a sleep preparation is first executed. The sleep preparation includes storing the working data of the system, powering down the processor and other chipsets, and then turning off the display signal. When the display does not detect a signal, the drivers and controllers inside the display switch from the work mode to the low-power sleep mode or standby mode. The backlight unit is then turned off to disable the display. Similarly, the wake-up operation process used by a conventional display is to first execute a wake-up preparation, including instructing the drivers and controllers to switch from standby mode to work mode, and then turn on the backlight unit to illuminate the display.

In the conventional sleep operation process, because it involves data storage, the processor and chipset control, and power control of drivers and controllers, in order to avoid too frequent power adjustments to the processor, chipset, drivers, and controllers, the idle time C is generally intended to be set longer, such as more than 5 minutes. However, as compared to the conventional process, the sleep and wake-up operation processes of the display according to the present invention do not involve the processor, chipset, driver, and controller control. Therefore, the idle time T can be set shorter and more energy efficient, such as less than 5 minutes or even 1 minute.

Furthermore, the sleep and wake-up operation processes of the display according to the present invention do not require executing both the sleep preparation and the wake-up preparation. Therefore, the display according to the present invention can quickly enter the sleep mode or the wake-up mode, thereby saving more energy over time.

Overall, the total execution time of the sleep and wake-up operation processes of the display according to the present invention can at least reduce or eliminate the extra time, as compared to the execution time of the sleep and wake-up operation processes of a conventional display.

In the sleep operation process of the display according to the present invention, it can eliminate the excess power waste resulting from the execution of the sleep preparation under the conventional process. In the wake-up operation process, when an increased usage rate of the processor or a system operation is detected, the display is immediately illuminated, thereby eliminating the wake-up preparation of the conventional process, and quickly returning the display to a working state.

In one embodiment, when the operation of the electronic device enters the off-peak period, since most of the time, there is no need to use the peripheral unit 80, in order to reduce or cut off the power consumption resulting from the peripheral unit 80, in the off-peak period, the peripheral control programming module 160 is configured to actively control the peripheral unit 80 of the electronic device 20 by commanding the peripheral unit 80 to enter a peripheral energy management mode.

The peripheral unit 80 preferably includes multiple physical input/output (I/O) interfaces, and multiple peripheral devices are connected to the input/output interfaces. The input/output interfaces are generally distinguished into a digital input/output interface and an analog input/output interface. The digital input/output interface preferably covers, but is not limited to: a universal serial bus (USB) interface, a serial communication port (COM) interface, and a network communication interface such as RJ45 interface. The analog input/output interface preferably covers, but is not limited to: a telecommunication interface such as RJ11 interface. The peripheral devices include, but are not limited to: a keyboard, a video, a mouse, and a stylus pen.

In one embodiment, the peripheral energy management mode includes: for the digital input/output interface, when the operation of the electronic device 20 enters the off-peak period, the peripheral control programming module 160 is configured to create a corresponding virtual digital input/output interface, simulate the peripheral device connected to the input/output interface, create a corresponding virtual name, and provide it for the operating system to recognize and identify. Then, during the off-peak period, the operating system constantly connects to the virtual digital input/output interface, thereby achieving the replacement of physical input/output interfaces with virtual ones, and bridging the operating system to the peripheral devices connected to the input/output interface using the virtual digital input/output interface.

After the above virtual interface configuration is completed, the peripheral control programming module 160 is configured to notify the embedded controller 40, to turn off the power output of the physical digital input/output interface, terminate providing power to the peripheral devices, and replace the physical input/output interface with the newly created virtual digital input/output interface during the entire off-peak period. Accordingly, the peripheral devices connected to the input/output interface enter a powered off state and cease operating, thereby achieving the effect of saving power consumption from the peripheral devices.

During the entire off-peak period, when an operation from a peripheral device is detected, the peripheral control programming module 160 is configured to notify the embedded controller 40 to turn on the power of the physical digital input/output interface, restart the operation of the peripheral device, but still continue to bridge the operating system to the peripheral device using the virtual digital input/output interface until the operation from the peripheral device is terminated.

When the electronic device exits the off-peak period, the peripheral control programming module 160 is configured to notify the embedded controller 40 to turn on the power of the physical digital input/output interface, terminate the virtual digital input/output interface, and resume the operation by the physical input/output interface and the connected peripheral devices.

Figure 12:
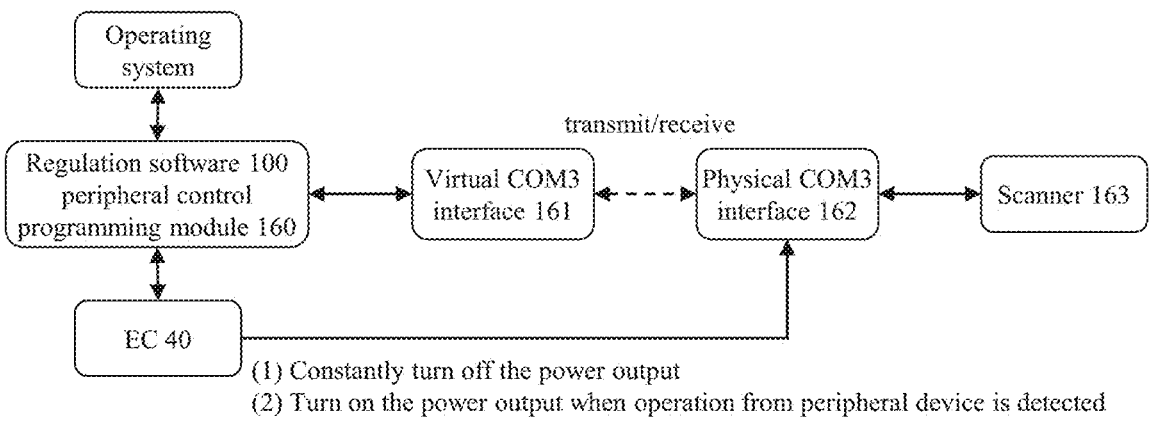
FIG. 12 is a block diagram illustrating the energy saving control logic, followed by the peripheral control programming module according to the present invention, applied to the digital COM3 input/output interface.

FIG. 12 is a block diagram illustrating the energy saving control logic, followed by the peripheral control programming module according to the present invention, applied to the digital COM3 input/output interface. Taking the commonly seen digital COM3 interface (RS-232) in the point of service (POS) device as an example, the peripheral control programming module 160 included in the power consumption control software 100 is configured to actively create a virtual COM3 interface 161 when the electronic device enters the off-peak period, and a corresponding virtual name for the scanner 163 connected to the physical COM3 interface 162, provide it for the operating system to recognize, and bridge the power consumption control software 100 to the physical COM3 interface 162 using the virtual COM3 interface 161. After the above virtual interface configuration is completed, the peripheral control programming module 160 is configured to instruct the embedded controller 40 to turn off the power of the physical COM3 interface 162, so to terminate providing power to the scanner 163.

Throughout the off-peak period, the virtual COM3 interface 161 continuously replaces the connection between the physical COM3 interface 162 and the operating system. This virtual COM3 interface 161 is configured to transmit or receive data from the physical COM3 interface 162. During the off-peak period, when an operation from a peripheral device is detected, the peripheral control programming module 160 is configured to notify the embedded controller 40 to turn on the power of the physical COM3 interface 162, until the operation from the peripheral device is completed. At the same time, however, the virtual COM3 interface 161 continues to replace the physical COM3 interface 162 and bridge the operating system to the peripheral device.

In one embodiment, for the digital input/output interface, when the operation of the electronic device 20 enters the off-peak period, the peripheral control programming module 160 is configured not to create a virtual digital input/output interface to replace the physical input/output interface. Instead, the peripheral control programming module 160 is configured only to notify the embedded controller 40 to constantly turn off the power output of the physical digital input/output interface during the off-peak period, to terminate the power supply to the peripheral devices. It also causes the peripheral devices connected to the digital input/output interface to enter a power-off state and cease operating, thereby achieving the effect of saving power consumption from the peripheral devices.

During the off-peak period, when the operating system detects an operation from a peripheral device, the peripheral control programming module 160 is configured to notify the embedded controller 40 to turn on the power of the physical digital input/output interface, to activate the operation of the peripheral device, until the operation from the peripheral device is completed.

When the electronic device exits the off-peak period, the peripheral control programming module 160 is configured to notify the embedded controller 40 to turn on the power output of the physical digital input/output interface, to resume the operation by the input/output interface and the connected peripheral devices.

In one embodiment, for the analog input/output interface, when the operation of the electronic device enters the off-peak period, the peripheral control programming module 160 is configured to notify the embedded controller 40 to constantly turn off the power output of the physical analog input/output interface, to cut off the power consumption from the peripheral devices.

When the operating system detects an operation from a peripheral device during the off-peak period, or when the electronic device exits the off-peak period, the peripheral control programming module 160 is configured to notify the embedded controller 40 to turn on the power output of the physical analog input/output interface, so as to resume the operation by the peripheral devices.

Figure 13:
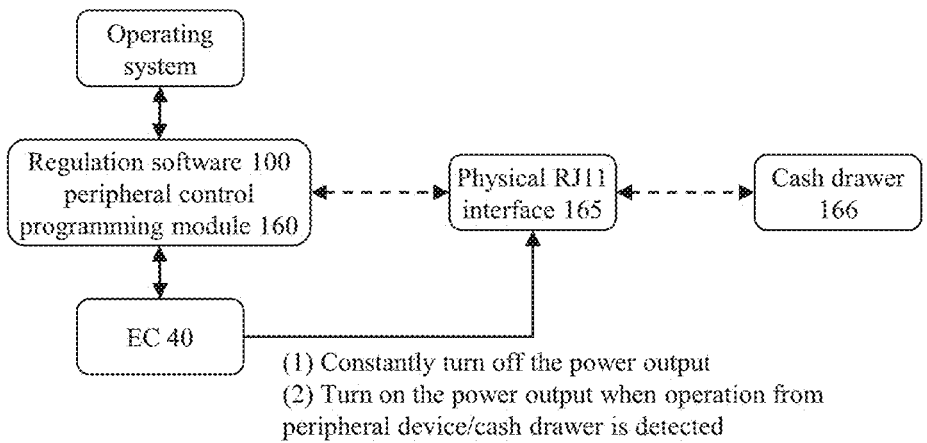
FIG. 13 is a block diagram illustrating the energy saving control logic, followed by the peripheral control programming module according to the present invention, applied to the analog RJ11 input/output interface.

FIG. 13 is a block diagram illustrating the energy saving control logic, followed by the peripheral control programming module according to the present invention, applied to the analog RJ11 input/output interface. For example, in a POS device, the commonly used analog input/output interface is the physical RJ11 interface 165 which is used to connect to the cash drawer 166. When the operation of the electronic device enters the off-peak period, the power supply of the physical RJ11 interface 165 is turned off to cease the operation of the cash drawer, thereby reducing the power consumption from the physical RJ11 interface 165 and saving the power wasted by the cash drawer 166 connected to the physical RJ11 interface 165 during the long standby process in the off-peak period.

Figure 14:
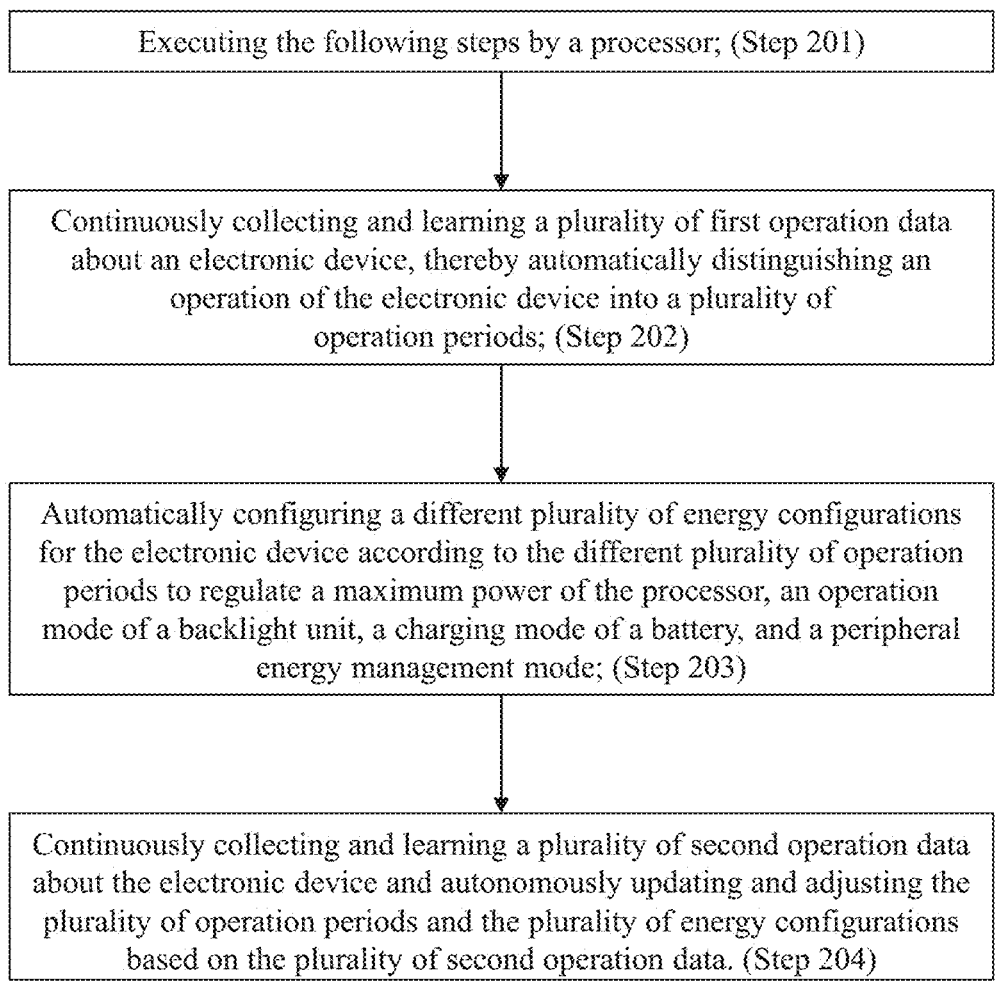
FIG. 14 is a flow chart illustrating multiple implementation steps for implementing the energy consumption regulation method according to the present invention.

FIG. 14 is a flow chart illustrating multiple implementation steps for implementing the energy consumption regulation method according to the present invention. In conclusion, the energy consumption regulation method 200 according to the present invention preferably includes, but is not limited to, the following implementation steps: executing the following steps by a processor (Step 201); continuously collecting and learning a plurality of first operation data about an electronic device, thereby automatically distinguishing an operation of the electronic device into a plurality of operation periods (Step 202); automatically configuring a different plurality of energy configurations for the electronic device according to the different plurality of operation periods to regulate a maximum power of the processor, an operation mode of a backlight unit, a charging mode of a battery, and a peripheral energy management mode (Step 203); and continuously collecting and learning a plurality of second operation data about the electronic device and autonomously updating and adjusting the plurality of operation periods and the plurality of energy configurations based on the plurality of second operation data (Step 204).

In summary, the energy consumption regulation software 100 according to the present invention is configured to communicate with BIOS, EC, and hardware, to detect system information and adjust system energy configurations, and further includes the following important features: (1) software automation for setting system performance; (2) integrated setting of system performance items; (3) detection of idle system state and reduction of power consumption; (4) flexible support for personalized power saving system settings; (5) integrated control of power supply of peripheral devices; (6) system status display; and (7) recording of system operation information.

The energy consumption regulation software 100 included in the present invention can also be regarded as "intelligent efficiency and energy control system software". It can run on various operating systems such as WINDOWS, Android, IOS, and Linux. Through this "intelligent efficiency and energy control system software", it is possible to achieve automatic control for system performance in the industrial computer systems to achieve the purpose of minimizing energy consumption. In terms of supporting battery powered devices, the energy consumption regulation software 100 provides battery status detection and various charging mode adjustment functions, solving the problems of battery and energy waste in long-term system operation.

As compared to conventional techniques, taking the Windows system as an example, power control options in the Windows system can be individually set for various system devices, such as hard disks, USB, PCI devices, and configurable/customizable device values, such as power saving, balanced, high performance, and so on. Although there are many customizable options, they may not necessarily satisfy the needs of ordinary users/consumers. The setup process is too sophisticated, and ordinary users may not fully understand the content and operation for all items and functions. Once certain settings are changed, they may directly affect system stability.

To address these problems, the energy consumption regulation software 100 according to the present invention provides automatic detection and adjustment functions that effectively improve these problems. It prevents ordinary users from accidentally changing settings without understanding the functions, resulting in irreparable errors and losses. Users need only use the integrated single software interface provided by the present invention to make all system settings. In addition, the software can automatically detect, adjust and optimize system settings.

There are further embodiments provided as follows.

Embodiment 1: An energy consumption regulation method includes: executing the following steps by a processor: continuously collecting and learning a plurality of first operation data about an electronic device, thereby automatically distinguishing an operation of the electronic device into a plurality of operation periods; automatically configuring a different plurality of energy configurations for the electronic device according to the different plurality of operation periods to regulate a maximum power of the processor, an operation mode of a backlight unit, a charging mode of a battery, and a peripheral energy management mode; and continuously collecting and learning a plurality of second operation data about the electronic device and autonomously updating and adjusting the plurality of operation periods and the plurality of energy configurations based on the plurality of second operation data.

Embodiment 2: The energy consumption regulation method according to Embodiment 1 further includes one of the following steps: executing a machine learning model by the processor to learn the first operation data of the electronic device, and automatically distinguishing the operation of the electronic device into the plurality of operation periods including a peak period, a buffer period, and an off-peak period accordingly, wherein the plurality of energy configurations include a first energy configuration, a second energy configuration, a third energy configuration, and an automatic energy configuration, and the processor has a thermal design power and the maximum power; configuring the first energy configuration for the electronic device when a current time enters the peak period, wherein the first energy configuration includes switching the processor to enter a high performance mode, limiting the maximum power to 90% of thermal design power plus a tolerance value and adjusting the maximum power by adding a fine tuning value, and rendering the charging mode to enter a highest capacity charging mode; configuring the second energy configuration for the electronic device when the current time enters the buffer period, wherein the second energy configuration includes switching the processor to enter a balance mode, limiting the maximum power to 70% of thermal design power plus the tolerance value and adjusting the maximum power by adding the fine tuning value, and rendering the charging mode to enter a balanced charging mode; and configuring the third energy configuration for the electronic device when the current time enters the off-peak period, wherein the third energy configuration includes switching the processor to enter an energy saving mode, limiting the maximum power to 60% of thermal design power plus the tolerance value and adjusting the maximum power by adding the fine tuning value, and rendering the charging mode to enter an optimal battery life charging mode.

Embodiment 3: The energy consumption regulation method according to Embodiment 1, the tolerance value is in a range between ±10%, and the fine tuning value is in a range within ±2%.

Embodiment 4: The energy consumption regulation method according to Embodiment 1 further includes one of the following steps: configuring the automatic energy configuration for the electronic device, switching the processor to enter an automatic performance mode, and executing an automatic power configuration logic as follows: computing a first average power for the processor during the peak period, and limiting the maximum power to within 110% of the first average power when the current time enters the peak period; computing a second average power for the processor during the buffer period, and limiting the maximum power to within the second average power when the current time enters the buffer period; computing a plurality of time-unit average powers for the processor during the off-peak period and taking a maximum, and selectively limiting the maximum power to within the maximum when the current time enters the off-peak period; and computing a plurality of time-unit average powers for the processor during the off-peak period and taking a minimum, and selectively limiting the maximum power to within the minimum when the current time enters the off-peak period.

Embodiment 5: The energy consumption regulation method according to Embodiment 4 further includes one of the following steps: reading a battery charge percentage, configuring the automatic energy configuration for the electronic device, switching the processor to enter the automatic performance mode, and executing an automatic power safety configuration logic as follows, when the electronic device is powered by the battery: limiting the maximum power to within 75% of the first average power, when the battery charge percentage is below 50% to 40% and the current time enters the peak period; limiting the maximum power to within 25% of the second average power, when the battery charge percentage is below 50% to 40% and the current time enters the buffer period; and limiting the maximum power to within 50% of the minimum value, when the battery charge percentage is below 50% to 40% and the current time enters the off-peak period.

Embodiment 6: The energy consumption regulation method according to Embodiment 2 further includes one of the following steps: executing the machine learning model to learn a plurality of discharge current data of the battery included in the electronic device, and cyclically analyzing a discharge behavior of the battery over different time periods, thereby automatically distinguishing a discharge operation of the battery into a plurality of discharge periods, wherein the plurality of discharge periods includes at least a low discharge period, a medium discharge period, and a high discharge period; implementing the optimal battery life charging mode to charge the battery slowly when the battery is in the low discharge period; implementing the balanced charging mode to charge the battery in a balanced manner when the battery is in the medium discharge period; and implementing the highest capacity charging mode to charge the battery quickly when the battery is in the high discharge period.

Embodiment 7: The energy consumption regulation method according to Embodiment 6 further includes one of the following steps: configuring the automatic energy configuration for the electronic device and rendering the charging mode to enter an automatic charging mode to charge the battery, wherein an implementation of the automatic charging mode includes one of the following steps: automatically determining whether the battery is in the low discharge period, and implementing the optimal battery life charging mode to charge the battery slowly when the battery is in the low discharge period; automatically determining whether the battery is in the medium discharge period, and implementing the balanced charging mode to charge the battery in a balanced manner when the battery is in the medium discharge period; and automatically determining whether the battery is in the high discharge period, and implementing the highest capacity charging mode to charge the battery quickly when the battery is in the high discharge period, wherein the implementation of the optimal battery life charging mode includes charging the battery according to an optimal battery life charging logic and using 60% of a design capacity of the battery as a charging limit, wherein the implementation of the balanced charging mode includes charging the battery according to a balanced charging logic and using 80% of the design capacity as the charging limit, wherein the implementation of the highest capacity charging mode includes charging the battery according to a highest capacity charging logic and using the design capacity as the charging limit.

Embodiment 8: The energy consumption regulation method according to Embodiment 2 further includes one of the following steps: implementing a backlight energy management mode based on the plurality of energy configurations, wherein the implementation of the backlight energy management mode includes one of the following steps: turning off a backlight unit of a display when a usage rate of the processor is lower than an idle usage rate and an idle operation time of a user interface displayed by the display included in the electronic device exceeds an idle time; turning on the backlight unit when the usage rate exceeds the idle usage rate; turning on the backlight unit when the user interface receives an operation instruction; turning on the backlight unit when a predefined voice pattern is recognized by a voice recognition module included in the electronic device; and turning on the backlight unit when a predefined image is recognized by an image recognition module included in the electronic device.

Embodiment 9: The energy consumption regulation method according to Embodiment 8, the idle usage rate is 20%, 15%, 10%, 8%, 5%, or a user-defined value.

Embodiment 10: The energy consumption regulation method according to Embodiment 2 further includes one of the following steps: implementing the peripheral energy management mode based on the plurality of energy configurations, wherein the implementation of the peripheral energy management mode includes one of the following steps: creating a corresponding virtual input/output interface for a physical input/output interface included in the electronic device when the electronic device enters to the energy saving mode; creating a corresponding virtual name for a peripheral device connected to the physical input/output interface when the electronic device enters to the energy saving mode; using the virtual input/output interface to replace the physical input/output interface to bridge an operating system with the peripheral device when the electronic device enters to the energy saving mode; and turning off an electrical power of the physical input/output interface when the electronic device enters to the energy saving mode.

Embodiment 11: The energy consumption regulation method according to Embodiment 1 further includes one of the following steps: recording a usage rate, a load rate, a graphics processor power consumption, a core power consumption, and a maximum power for a processor; recording an electric current value of the electronic device over time, wherein the electric current value includes a positive value indicating an AC power supply, a zero value indicating an AC power supply with the battery being fully charged, and a negative value indicating a DC power supply; recording a power supply mode and a power supply mode duration for the electronic device, wherein the power supply mode includes a DC power supply mode and an AC power supply mode; recording a power supply mode switching time for the electronic device; recording a startup time and a shutdown time for the electronic device; when the power supply mode is switched to the DC power supply mode: reading and recording a battery information of the electronic device, wherein the battery information includes a current full charge capacity, a current battery capacity, and a design capacity; computing a percentage of the current full charge capacity divided by the design capacity to obtain a battery health level; computing a percentage of the current full charge capacity divided by the current battery capacity to obtain a battery charge percentage; and aggregating the usage rate, the load rate, the graphics processor power consumption, the core power consumption, the maximum power, the electric current value, the power supply mode, the power supply mode duration, the DC power supply mode, the AC power supply mode, the power supply mode switching time, the startup time, the shutdown time, the current full charge capacity, the current battery capacity, and the design capacity to form the first operation data and the second operation data.

Embodiment 12: An energy consumption regulation method includes: executing the following steps by a processor: continuously collecting and learning a plurality of first discharge current data of a battery included in an electronic device, and automatically distinguishing a discharge operation of the battery into a plurality of discharge periods accordingly; configuring a different plurality of charging configurations for the battery according to the different plurality of discharge periods; and continuously collecting and learning a plurality of second discharge current data of the electronic device, and automatically updating and adjusting the plurality of discharge periods and the plurality of charging configurations based on the second discharge current data.

Embodiment 13: The energy consumption regulation method according to Embodiment 12 further includes one of the following steps: executing a machine learning model by the processor to learn the plurality of first discharge current data of the battery, and cyclically analyzing a discharge behavior of the battery over different time periods, thereby automatically distinguishing a discharge operation of the battery into a plurality of discharge periods, wherein the plurality of discharge periods includes at least a low discharge period, a medium discharge period, and a high discharge period, and the plurality of charging configurations includes optimal battery life charging mode, a balanced charging mode, and a highest capacity charging mode; implementing the optimal battery life charging mode to charge the battery slowly when the battery is in the low discharge period; implementing the balanced charging mode to charge the battery in a balanced manner when the battery is in the medium discharge period; implementing the highest capacity charging mode to charge the battery quickly when the battery is in the high discharge period; selectively implementing the optimal battery life charging mode to charge the battery according to an optimal battery life charging logic and use 60% of a design capacity of the battery as a charging limit; selectively implementing the balanced charging mode to charge the battery according to a balanced charging logic and use 80% of the design capacity as the charging limit; and selectively implementing the highest capacity charging mode to charge the battery according to a highest capacity charging logic and use the design capacity as the charging limit.

Embodiment 14: An energy consumption regulation method includes: executing the following steps by a processor having a maximum power: executing an automatic power safety configuration logic as follows, when the electronic device is powered by the battery: limiting the maximum power to within 75% of a peak average power of the processor during a peak period, when the current time enters the peak period; limiting the maximum power to within 25% of a buffer average power of the processor during a buffer period, when the current time enters the buffer period; and limiting the maximum power to within 50% of a minimum value out of a plurality of time-unit average powers of the processor during the off-peak period, when the current time enters the off-peak period.

Embodiment 15: An energy consumption regulation system includes: an electronic device including a processor, wherein the processor is configured to: continuously collect and learn a plurality of first operation data about an electronic device, thereby automatically distinguishing an operation of the electronic device into a plurality of operation periods; automatically configure a different plurality of energy configurations for the electronic device according to the different plurality of operation periods to regulate a maximum power of the processor, an operation mode of a backlight unit, a charging mode of a battery, and a peripheral energy management mode; and continuously collect and learn a plurality of second operation data about the electronic device and autonomously update and adjust the plurality of operation periods and the plurality of energy configurations based on the plurality of second operation data.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. An energy consumption regulation method, comprising:

executing the following steps by a processor:
continuously collecting and learning a plurality of first operation data about an electronic device, thereby automatically distinguishing an operation of the electronic device into a plurality of operation periods;

automatically configuring a different plurality of energy configurations for the electronic device according to the different plurality of operation periods to regulate a maximum power of the processor, an operation mode of a backlight unit, a charging mode of a battery, and a peripheral energy management mode; and continuously collecting and learning a plurality of second operation data about the electronic device and autonomously updating and adjusting the plurality of operation periods and the plurality of energy configurations based on the plurality of second operation data, wherein the energy consumption regulation method further comprises executing one of the following steps by the processor:

executing a machine learning model by the processor to learn the first operation data of the electronic device, and automatically distinguishing the operation of the electronic device into the plurality of operation periods comprising a peak period, a buffer period, and an off-peak period accordingly, wherein the plurality of energy configurations comprise a first energy configuration, a second energy configuration, a third energy configuration, and an automatic energy configuration, and the processor has a thermal design power and the maximum power;

configuring the first energy configuration for the electronic device when a current time enters the peak period, wherein the first energy configuration comprises switching the processor to enter a high performance mode, limiting the maximum power to 90% of the thermal design power plus a tolerance value and adjusting the maximum power by adding a fine tuning value, and rendering the charging mode to enter a highest capacity charging mode;

configuring the second energy configuration for the electronic device when the current time enters the buffer period, wherein the second energy configuration comprises switching the processor to enter a balance mode, limiting the maximum power to 70% of the thermal design power plus the tolerance value and adjusting the maximum power by adding the fine tuning value, and rendering the charging mode to enter a balanced charging mode; and configuring the third energy configuration for the electronic device when the current time enters the off-peak period, wherein the third energy configuration comprises switching the processor to enter an energy saving mode, limiting the maximum power to 60% of the thermal design power plus the tolerance value and adjusting the maximum power by adding the fine tuning value, and rendering the charging mode to enter an optimal battery life charging mode.

2. The energy consumption regulation method according to claim 1, wherein the tolerance value is in a range between ±10%, and the fine tuning value is in a range within ±2%.

3. The energy consumption regulation method according to claim 1, further comprising one of the following steps:

configuring the automatic energy configuration for the electronic device, switching the processor to enter an automatic performance mode, and executing an automatic power configuration logic as follows:

computing a first average power for the processor during the peak period, and limiting the maximum power to within 110% of the first average power when the current time enters the peak period;

computing a second average power for the processor during the buffer period, and limiting the maximum power to within the second average power when the current time enters the buffer period;

computing a plurality of time-unit average powers for the processor during the off-peak period and taking a maximum, and selectively limiting the maximum power to within the maximum when the current time enters the off-peak period; and computing a plurality of time-unit average powers for the processor during the off-peak period and taking a minimum, and selectively limiting the maximum power to within the minimum when the current time enters the off-peak period.

4. The energy consumption regulation method according to claim 3, further comprising one of the following steps:

reading a battery charge percentage, configuring the automatic energy configuration for the electronic device, switching the processor to enter the automatic performance mode, and executing an automatic power safety configuration logic as follows, when the electronic device is powered by the battery:

limiting the maximum power to within 75% of the first average power, when the battery charge percentage is below 50% to 40% and the current time enters the peak period;

limiting the maximum power to within 25% of the second average power, when the battery charge percentage is below 50% to 40% and the current time enters the buffer period; and limiting the maximum power to within 50% of the minimum value, when the battery charge percentage is below 50% to 40% and the current time enters the off-peak period.

5. The energy consumption regulation method according to claim 1, further comprising one of the following steps:

executing the machine learning model to learn a plurality of discharge current data of the battery comprised in the electronic device, and cyclically analyzing a discharge behavior of the battery over different time periods, thereby automatically distinguishing a discharge operation of the battery into a plurality of discharge periods, wherein the plurality of discharge periods comprises at least a low discharge period, a medium discharge period, and a high discharge period;

implementing the optimal battery life charging mode to charge the battery slowly when the battery is in the low discharge period;

implementing the balanced charging mode to charge the battery in a balanced manner when the battery is in the medium discharge period; and implementing the highest capacity charging mode to charge the battery quickly when the battery is in the high discharge period.

6. The energy consumption regulation method according to claim 5, further comprising one of the following steps:

configuring the automatic energy configuration for the electronic device and rendering the charging mode to enter an automatic charging mode to charge the battery, wherein an implementation of the automatic charging mode comprises one of the following steps:

automatically determining whether the battery is in the low discharge period, and implementing the optimal battery life charging mode to charge the battery slowly when the battery is in the low discharge period;

automatically determining whether the battery is in the medium discharge period, and implementing the balanced charging mode to charge the battery in a balanced manner when the battery is in the medium discharge period; and automatically determining whether the battery is in the high discharge period, and implementing the highest capacity charging mode to charge the battery quickly when the battery is in the high discharge period, wherein an implementation of the optimal battery life charging mode comprises charging the battery according to an optimal battery life charging logic and using 60% of a design capacity of the battery as a charging limit, wherein an implementation of the balanced charging mode comprises charging the battery according to a balanced charging logic and using 80% of the design capacity as the charging limit, wherein an implementation of the highest capacity charging mode comprises charging the battery according to a highest capacity charging logic and using the design capacity as the charging limit.

7. The energy consumption regulation method according to claim 1, further comprising one of the following steps:

implementing a backlight energy management mode based on the plurality of energy configurations, wherein an implementation of the backlight energy management mode comprises one of the following steps:

turning off a backlight unit of a display when a usage rate of the processor is lower than an idle usage rate and an idle operation time of a user interface displayed by the display comprised in the electronic device exceeds an idle time;

turning on the backlight unit when the usage rate exceeds the idle usage rate;

turning on the backlight unit when the user interface receives an operation instruction;

turning on the backlight unit when a predefined voice pattern is recognized by a voice recognition module comprised in the electronic device; and turning on the backlight unit when a predefined image is recognized by an image recognition module comprised in the electronic device.

8. The energy consumption regulation method according to claim 7, wherein the idle usage rate is 20%, 15%, 10%, 8%, 5%, or a user-defined value.

9. The energy consumption regulation method according to claim 1, further comprising one of the following steps:
implementing the peripheral energy management mode based on the plurality of energy configurations, wherein an implementation of the peripheral energy management mode comprises one of the following steps:
creating a corresponding virtual input/output interface for a physical input/output interface comprised in the electronic device when the electronic device enters to the energy saving mode;
creating a corresponding virtual name for a peripheral device connected to the physical input/output interface when the electronic device enters to the energy saving mode;
using the virtual input/output interface to replace the physical input/output interface to bridge an operating system with the peripheral device when the electronic device enters to the energy saving mode; and
turning off an electrical power of the physical input/output interface when the electronic device enters to the energy saving mode.

10. The energy consumption regulation method according to claim 1, further comprising one of the following steps:
recording a usage rate, a load rate, a graphics processor power consumption, a core power consumption, and a maximum power for a processor;
recording an electric current value of the electronic device over time, wherein the electric current value comprises a positive value indicating an AC power supply, a zero value indicating an AC power supply with the battery being fully charged, and a negative value indicating a DC power supply;
recording a power supply mode and a power supply mode duration for the electronic device, wherein the power supply mode comprises a DC power supply mode and an AC power supply mode;
recording a power supply mode switching time for the electronic device;
recording a startup time and a shutdown time for the electronic device;
when the power supply mode is switched to the DC power supply mode:
reading and recording a battery information of the electronic device, wherein the battery information comprises a current full charge capacity, a current battery capacity, and a design capacity;
computing a percentage of the current full charge capacity divided by the design capacity to obtain a battery health level;
computing a percentage of the current full charge capacity divided by the current battery capacity to obtain a battery charge percentage; and
aggregating the usage rate, the load rate, the graphics processor power consumption, the core power consumption, the maximum power, the electric current value, the power supply mode, the power supply mode duration, the DC power supply mode, the AC power supply mode, the power supply mode switching time, the startup time, the shutdown time, the current full charge capacity, the current battery capacity, and the design capacity to form the first operation data and the second operation data.

11. An energy consumption regulation method, comprising:
executing the following steps by a processor:
continuously collecting and learning a plurality of first discharge current data of a battery comprised in an electronic device, and automatically distinguishing a discharge operation of the battery into a plurality of discharge periods accordingly;
configuring a different plurality of charging configurations for the battery according to the different plurality of discharge periods;
automatically configuring a different plurality of energy configurations for the electronic device according to the different plurality of operation periods to regulate a maximum power of the processor; and
continuously collecting and learning a plurality of second discharge current data of the electronic device, and automatically updating and adjusting the plurality of discharge periods and the plurality of charging configurations based on the second discharge current data,
wherein the energy consumption regulation method further comprises executing one of the following steps by the processor:
executing a machine learning model by the processor to learn the first operation data of the electronic device, and automatically distinguishing the operation of the electronic device into the plurality of operation periods comprising a peak period, a buffer period, and an off-peak period accordingly, wherein the plurality of energy configurations comprise a first energy configuration, a second energy configuration, a third energy configuration, and an automatic energy configuration, and the processor has a thermal design power and the maximum power;
configuring the first energy configuration for the electronic device when a current time enters the peak period, wherein the first energy configuration comprises switching the processor to enter a high performance mode, limiting the maximum power to 90% of the thermal design power plus a tolerance value and adjusting the maximum power by adding a fine tuning value, and rendering the charging mode to enter a highest capacity charging mode;
configuring the second energy configuration for the electronic device when the current time enters the buffer period, wherein the second energy configuration comprises switching the processor to enter a balance mode, limiting the maximum power to 70% of the thermal design power plus the tolerance value and adjusting the maximum power by adding the fine tuning value, and rendering the charging mode to enter a balanced charging mode; and
configuring the third energy configuration for the electronic device when the current time enters the off-peak period, wherein the third energy configuration comprises switching the processor to enter an energy saving mode, limiting the maximum power to 60% of the thermal design power plus the tolerance value and adjusting the maximum power by adding the fine tuning value, and rendering the charging mode to enter an optimal battery life charging mode.

12. The energy consumption regulation method according to claim 11, further comprising one of the following steps:
executing a machine learning model by the processor to learn the plurality of first discharge current data of the battery, and cyclically analyzing a discharge behavior of the battery over different time periods, thereby automatically distinguishing a discharge operation of the battery into a plurality of discharge periods, wherein the plurality of discharge periods comprises at least a low discharge period, a medium discharge period, and a high discharge period, and the plurality of charging configurations comprises optimal battery life charging mode, a balanced charging mode, and a highest capacity charging mode;
implementing the optimal battery life charging mode to charge the battery slowly when the battery is in the low discharge period;
implementing the balanced charging mode to charge the battery in a balanced manner when the battery is in the medium discharge period;
implementing the highest capacity charging mode to charge the battery quickly when the battery is in the high discharge period;
selectively implementing the optimal battery life charging mode to charge the battery according to an optimal battery life charging logic and use 60% of a design capacity of the battery as a charging limit;
selectively implementing the balanced charging mode to charge the battery according to a balanced charging logic and use 80% of the design capacity as the charging limit; and
selectively implementing the highest capacity charging mode to charge the battery according to a highest capacity charging logic and use the design capacity as the charging limit.

13. An energy consumption regulation method, comprising:
executing the following steps by a processor having a maximum power:
executing an automatic power safety configuration logic as follows, when an electronic device is powered by the battery:
limiting the maximum power to within 75% of a peak average power of the processor during a peak period, when the current time enters the peak period;
limiting the maximum power to within 25% of a buffer average power of the processor during a buffer period, when the current time enters the buffer period;
limiting the maximum power to within 50% of a minimum value out of a plurality of time-unit average powers of the processor during the off-peak period, when the current time enters the off-peak period; and
automatically configuring a different plurality of energy configurations for the electronic device according to the different plurality of operation periods to regulate the maximum power of the processor,
wherein the energy consumption regulation method further comprises executing one of the following steps by the processor:
executing a machine learning model by the processor to learn the first operation data of the electronic device, and automatically distinguishing the operation of the electronic device into the plurality of operation periods comprising a peak period, a buffer period, and an off-peak period accordingly, wherein the plurality of energy configurations comprise a first energy configuration, a second energy configuration, a third energy configuration, and an automatic energy configuration, and the processor has a thermal design power and the maximum power;
configuring the first energy configuration for the electronic device when a current time enters the peak period, wherein the first energy configuration comprises switching the processor to enter a high performance mode, limiting the maximum power to 90% of the thermal design power plus a tolerance value and adjusting the maximum power by adding a fine tuning value, and rendering the charging mode to enter a highest capacity charging mode;
configuring the second energy configuration for the electronic device when the current time enters the buffer period, wherein the second energy configuration comprises switching the processor to enter a balance mode, limiting the maximum power to 70% of the thermal design power plus the tolerance value and adjusting the maximum power by adding the fine tuning value, and rendering the charging mode to enter a balanced charging mode; and
configuring the third energy configuration for the electronic device when the current time enters the off-peak period, wherein the third energy configuration comprises switching the processor to enter an energy saving mode, limiting the maximum power to 60% of the thermal design power plus the tolerance value and adjusting the maximum power by adding the fine tuning value, and rendering the charging mode to enter an optimal battery life charging mode.

14. An energy consumption regulation system, comprising:
an electronic device comprising a processor, wherein the processor is configured to:
continuously collect and learn a plurality of first operation data about an electronic device, thereby automatically distinguishing an operation of the electronic device into a plurality of operation periods;
automatically configure a different plurality of energy configurations for the electronic device according to the different plurality of operation periods to regulate a maximum power of the processor, an operation mode of a backlight unit, a charging mode of a battery, and a peripheral energy management mode; and
continuously collect and learn a plurality of second operation data about the electronic device and autonomously update and adjust the plurality of operation periods and the plurality of energy configurations based on the plurality of second operation data,
wherein the processor is configured to further perform one of the following steps:
executing a machine learning model by the processor to learn the plurality of first operation data of the electronic device, and automatically distinguishing the operation of the electronic device into the plurality of operation periods comprising a peak period, a buffer period, and an off-peak period accordingly, wherein the plurality of energy configurations comprise a first energy configuration, a second energy configuration, a third energy configuration, and an automatic energy configuration, and the processor has a thermal design power and the maximum power;

configuring the first energy configuration for the electronic device when a current time enters the peak period, wherein the first energy configuration comprises switching the processor to enter a high performance mode, limiting the maximum power to 90% of the thermal design power plus a tolerance value and adjusting the maximum power by adding a fine tuning value, and rendering the charging mode to enter a highest capacity charging mode;

configuring the second energy configuration for the electronic device when the current time enters the buffer period, wherein the second energy configuration comprises switching the processor to enter a balance mode, limiting the maximum power to 70% of the thermal design power plus the tolerance value and adjusting the maximum power by adding the fine tuning value, and rendering the charging mode to enter a balanced charging mode; and configuring the third energy configuration for the electronic device when the current time enters the off-peak period, wherein the third energy configuration comprises switching the processor to enter an energy saving mode, limiting the maximum power to 60% of the thermal design power plus the tolerance value and adjusting the maximum power by adding the fine tuning value, and rendering the charging mode to enter an optimal battery life charging mode.

* * * * *